(12) United States Patent
Kim

(10) Patent No.: US 11,727,693 B2
(45) Date of Patent: Aug. 15, 2023

(54) METHOD, APPARATUS, ELECTRONIC DEVICE, COMPUTER PROGRAM AND COMPUTER-READABLE RECORDING MEDIUM FOR DETECTING LANE MARKING BASED ON VEHICLE IMAGE

(71) Applicant: THINKWARE CORPORATION, Seongnam-si (KR)

(72) Inventor: Shin Hyoung Kim, Seongnam-si (KR)

(73) Assignee: THINKWARE CORPORATION, Seongnam-si (KR)

( * ) Notice: Subject to any disclaimer, the term of this patent is extended or adjusted under 35 U.S.C. 154(b) by 103 days.

(21) Appl. No.: 17/222,212

(22) Filed: Apr. 5, 2021

(65) Prior Publication Data

US 2021/0319237 A1    Oct. 14, 2021

(30) Foreign Application Priority Data

Apr. 10, 2020  (KR) ................ 10-2020-0044088

(51) Int. Cl.
*G06V 20/56* (2022.01)
*G06V 10/44* (2022.01)
*G06V 10/75* (2022.01)

(52) U.S. Cl.
CPC ........... *G06V 20/588* (2022.01); *G06V 10/44* (2022.01); *G06V 10/755* (2022.01)

(58) Field of Classification Search
None
See application file for complete search history.

(56) References Cited

U.S. PATENT DOCUMENTS

| | | | | |
|---|---|---|---|---|
| 6,591,000 B1 * | 7/2003 | Oike | ............... | G06V 20/588 701/28 |
| 6,879,706 B2 * | 4/2005 | Satoh | ............... | G06V 10/44 382/104 |
| 11,441,916 B1 * | 9/2022 | Konrardy | ............... | H04W 4/40 |
| 2002/0080019 A1 * | 6/2002 | Satoh | ............... | G06V 20/588 340/436 |
| 2011/0103650 A1 * | 5/2011 | Cheng | ............... | G06V 20/58 382/104 |
| 2013/0028473 A1 * | 1/2013 | Hilldore | ............... | G06V 20/56 382/103 |

(Continued)

FOREIGN PATENT DOCUMENTS

| | | | |
|---|---|---|---|
| CN | 206217878 U | * | 6/2017 |
| CN | 107578012 A | * | 1/2018 |
| CN | 107590438 A | * | 1/2018 |

(Continued)

*Primary Examiner* — Randolph I Chu
(74) *Attorney, Agent, or Firm* — WHDA, LLP

(57) ABSTRACT

There is provided a method for detecting a lane marking using a processor including acquiring a drive image captured by an image capturing device of a vehicle which is running, detecting an edge corresponding to a lane marking from the acquired drive image and generating an edge image based on the detected edge, detecting a linear component based on the detected edge and generating a linearly processed edge image based on the detected linear component, detecting a lane marking point corresponding to the lane marking using the generated edge image and the linearly processed edge image, and detecting the lane marking based on the detected lane marking point.

18 Claims, 22 Drawing Sheets

(56) References Cited

U.S. PATENT DOCUMENTS

| | | | |
|---|---|---|---|
| 2021/0319237 A1* | 10/2021 | Kim | .................... G06V 20/588 |
| 2022/0282994 A1* | 9/2022 | Goldman | ........ B60W 30/18109 |

FOREIGN PATENT DOCUMENTS

| | | | | |
|---|---|---|---|---|
| CN | 107609486 A | * | 1/2018 | |
| CN | 107944388 A | * | 4/2018 | |
| CN | 108154114 A | * | 6/2018 | ......... G06K 9/00798 |
| CN | 108256510 A | * | 7/2018 | ......... G06K 9/00798 |
| DE | 102015201566 A1 | * | 8/2016 | |
| JP | 2005119661 A | * | 5/2005 | |
| KR | 20120098292 A | * | 9/2012 | ........... G06V 20/588 |
| KR | 101862994 B1 | * | 5/2018 | ............... G06T 5/50 |
| WO | WO-2020048487 A1 | * | 3/2020 | |

* cited by examiner 3705  3702    3701  3703  3704

METHOD, APPARATUS, ELECTRONIC DEVICE, COMPUTER PROGRAM AND COMPUTER-READABLE RECORDING MEDIUM FOR DETECTING LANE MARKING BASED ON VEHICLE IMAGE

CROSS-REFERENCE TO RELATED APPLICATION

This application claims the priority and benefit of Korean Patent Application No. 10-2020-0044088 filed on Apr. 10, 2020, with the Korean Intellectual Property Office, the disclosure of which is incorporated herein by reference.

BACKGROUND OF THE INVENTION

1. Field of the Invention

The present invention relates to a method, apparatus, computer program, and computer-readable recording medium for detecting a lane marking based on a vehicle image.

In addition, the present invention relates to an electronic device that provides guidance for assisting a driver based on a detected lane marking.

In addition, the present invention relates to an autonomous driving system that controls autonomous driving of a vehicle based on a detected lane marking.

2. Description of the Related Art

Safe driving and prevention of traffic accidents are most important in vehicle driving, and to this end, vehicles are equipped with various auxiliary devices to control posture of vehicles, functions of components of vehicles, and safety devices such as seat belts, airbags, and the like.

In addition, recently, devices such as black boxes tend to be installed in vehicles to store drive images of vehicles and data transmitted from various sensors, thereby identifying causes in case of accidents of vehicles. Portable terminals such as smartphones and tablets, which may be equipped with black boxes or navigation applications, are used as vehicle devices.

Accordingly, recently, advanced driver assistance systems (ADAS) that assist a driver in driving of a vehicle using an image captured during driving of the vehicle have been developed and distributed to promote safe driving and driver convenience.

In addition, as the IT technology has developed rapidly, interest in autonomous vehicles integrated with a vision system has increased.

In order to accurately determine lane departure and lane maintenance of an autonomous vehicle, it is very important to accurately recognize a lane marking of a lane in which the vehicle is running from a drive image captured while the vehicle is running. Lane departure due to failure of accurate recognition of a lane marking of a lane in which the vehicle is running may be directly connected to an accident.

Meanwhile, in recent years, augmented reality (AR) navigation for displaying various guide information on a screen containing the real world actually viewed by a user has also rapidly developed. The AR navigation generates an augmented reality route guide line indicating a route from a current location of a vehicle to a destination using existing route line data and displays the AR route guide line in augmented reality.

However, in the AR navigation, an actual lane and the AR route guide line are not seen as being matched and cause a difference according to GPS reception speeds, which is a factor deteriorating the sense of reality, an advantage of AR. In addition, it is difficult to display AR route guide lines in an environment where route line data is not present or not provided.

Therefore, even in the AR navigation, it is necessary to accurately recognize a lane marking of a lane in which the vehicle is running and to realistically express an AR route guide line.

Meanwhile, according to the lane marking recognition technology of the related art, a curved lane marking is detected using information such as colors and edges, but curved lane markings are frequently erroneously detected due to vehicles of adjacent lanes, other obstacles, and road markings.

SUMMARY

An aspect of the present invention may provide a vision-based method, apparatus, computer program, and computer-readable recording medium for accurately detecting both a linear lane marking and curved lane marking from a drive image captured while a vehicle is running.

An aspect of the present invention may also provide an augmented reality (AR)-based electronic device that realistically expresses an AR guidance object (especially, a route guidance object and a lane departure guidance object) by accurately recognizing a lane marking of a lane in which a vehicle is running.

An aspect of the present invention may also provide an autonomous driving system of controlling autonomous driving of a vehicle by accurately recognizing a lane marking of a lane in which a vehicle is running.

According to an aspect of the present invention, a method for detecting a lane marking using a processor includes: acquiring a drive image captured by an image capturing device of a vehicle which is running; detecting an edge corresponding to a lane marking from the acquired drive image and generating an edge image based on the detected edge; detecting a linear component based on the detected edge and generating a linearly processed edge image based on the detected linear component; detecting a lane marking point corresponding to the lane marking using the generated edge image and the linearly processed edge image; and detecting the lane marking based on the detected lane marking point.

The method may further include: generating a top view image by transforming a view of a front view image corresponding to the acquired drive image, wherein, in the detecting of an edge, an edge corresponding to the lane marking may be detected from the top view image.

The method may further include: dividing the top view image into a first region and a second region according to a distance from the vehicle, wherein, in the generating of a linearly processed edge image, the linear component may be detected from each of a first edge image corresponding to the divided first region and a second edge image corresponding to the second region, and a linearly processed edge image may be generated based on the detected linear component.

In the detecting of a lane marking point, a lane marking point corresponding to a left lane marking and a lane marking point corresponding to a right lane marking may be separately detected.

The detecting of a lane marking point may include: detecting an initial lane marking point using at least one of the generated edge image and the linearly processed edge image; and generating a search window, applying the generated search window to each of the generated edge image and the linearly processed edge image, and detecting a subsequent lane marking point satisfying a preset condition from the applied search window.

The determining of an initial lane marking point may include: detecting a left initial lane marking point at which a brightness value of a left side is maximized at a lower end of the edge image; and detecting a right initial lane marking point at which a brightness value of a right side is maximized at the lower end of the edge image.

The detecting of a subsequent lane marking point may include: generating a first search window based on the determined initial lane marking point; detecting a first subsequent lane marking point satisfying a preset condition by applying the generated first search window to each of the edge image and the linearly processed edge image; generating a second search window in which a row, in which the first subsequent lane marking point is located in the first search window, is set to a central row; and disposing the generated second search window above the first search window and detecting a second subsequent lane marking point satisfying the preset condition by applying the second search window to each of the edge image and the linearly processed edge image.

A lane marking point satisfying the preset condition may be detected only from a middle row of the search window.

A row size of the search window may be changed adaptively according to an inclination of the linear component.

The method may further include: calculating an energy value of an active contour model (ACM), wherein the preset condition is a lane marking point at which the energy value of the ACM is minimized.

The calculating of an ACM energy value may include: calculating an internal energy value using an average distance between previous lane marking points and a distance between a current lane marking point and a previous lane marking point; and calculating an external energy value using brightness values of lane marking points detected from each of the edge image and the linearly processed edge image.

The detecting of a lane marking may further include: calculating a curve equation formed by the detected lane marking points; and approximating the lane marking points to a curve based on the calculated curve equation.

The detecting of a lane marking may include: detecting lane marking points of the drive image corresponding to lane marking points of the top view image by transforming the lane marking points detected from the top view image into a view of the acquired drive image; and detecting a lane marking based on the detected lane marking points of the drive image.

According to another aspect of the present invention, an apparatus for detecting a lane marking includes: an image acquiring unit acquiring a drive image captured by an image capturing device of a vehicle which is running; an edge detecting unit detecting an edge corresponding to a lane marking from the acquired drive image and generating an edge image based on the detected edge; a linear component detecting unit detecting a linear component based on the detected edge and generating a linearly processed edge image based on the detected linear component; a lane marking point detecting unit detecting a lane marking point corresponding to the lane marking using the generated edge image and the linearly processed edge image; and a lane marking detecting unit detecting the lane marking based on the detected lane marking point.

The apparatus may further include: an image view transforming unit generating a top view image by transforming a view of a front view image corresponding to the acquired drive image, wherein the edge detecting unit may detect an edge corresponding to the lane marking from the top view image.

The apparatus may further include: an image region dividing unit dividing the top view image into a first region and a second region according to a distance from the vehicle, wherein the linear component may be detected from each of a first edge image corresponding to the divided first region and a second edge image corresponding to the second region, and a linearly processed edge image may be generated based on the detected linear component.

The lane marking point detecting unit may detect a lane marking point corresponding to a left lane marking and a lane marking point corresponding to a right lane marking.

The lane marking point detecting unit may include: an initial lane marking point detecting unit detecting an initial lane marking point using at least one of the generated edge image and the linearly processed edge image; and a subsequent lane marking point detecting unit generating a search window, applying the generated search window to each of the generated edge image and the linearly processed edge image, and detecting a subsequent lane marking point satisfying a preset condition from the applied search window.

The initial lane marking point detecting unit may detect a left initial lane marking point at which a brightness value of a left side is maximized at a lower end of the edge image and detect a right initial lane marking point at which a brightness value of a right side is maximized at the lower end of the edge image.

The subsequent lane marking point detecting unit may generate a first search window based on the determined initial lane marking point, detect a first subsequent lane marking point satisfying a preset condition by applying the generated first search window to the edge image and the linearly processed edge image, generate a second search window in which a row, in which the first subsequent lane marking point is located in the first search window, is set to a central row, and dispose the generated second search window above the first search window and detect a second subsequent lane marking point satisfying the preset condition by applying the second search window to each of the edge image and the linearly processed edge image.

A lane marking point satisfying the preset condition may be detected only from a middle row of the search window.

A row size of the search window may be changed adaptively according to an inclination of the linear component.

The apparatus may further include: an active contour model energy (ACM) calculating unit calculating an energy value of an ACM, wherein the preset condition is a lane marking point at which the energy value of the ACM is minimized.

The ACM energy calculating unit may calculate an internal energy value using an average distance between previous lane marking points and a distance between a current lane marking point and a previous lane marking point and calculate an external energy value using brightness values of lane marking points detected from each of the edge image and the linearly processed edge image.

The apparatus may further include: a lane marking point approximating unit calculating a curve equation formed by the detected lane marking points and approximating the lane marking points to a curve based on the calculated curve equation.

The lane marking detecting unit may detect lane marking points of the drive image corresponding to lane marking points of the top view image by transforming the lane marking points detected from the top view image into a view of the acquired drive image, and detect a lane marking based on the detected lane marking points of the drive image.

According to another aspect of the present invention, an electronic device for providing guidance to assist a driver by detecting a lane marking includes: a display unit displaying guidance information that can be checked by the driver; an image acquiring unit acquiring a drive image captured by an image capturing device; an edge detecting unit detecting an edge corresponding to a lane marking from the acquired drive image and generating an edge image based on the detected edge; a linear component detecting unit detecting a linear component based on the detected edge and generating a linearly processed edge image based on the detected linear component; a lane marking point detecting unit detecting a lane marking point corresponding to the lane marking from the generated edge image and the linearly processed edge image; a lane marking detecting unit detecting the lane marking from the detected lane marking point; and a controller controlling the display unit to perform guidance based on the detected lane marking.

The electronic device may further include: an augmented reality (AR) providing unit generating a route guidance object guiding a route from a current location of the vehicle to a destination and generating an AR image to display the generated route guidance object in a lane of the captured drive image based on the detected lane marking, wherein the controller may control the display unit to display the generated AR image.

The electronic device may further include: an AR providing unit generating a lane departure guidance object guiding lane departure of the vehicle and generating an AR image to display the generated lane departure guidance object on a lane marking based on the detected lane marking, wherein the controller may control the display unit to display the generated AR image.

According to another exemplary embodiment of the present invention, a computer-readable recording medium in which a program for executing the lane marking detecting method is recorded may be provided.

According to another exemplary embodiment of the present invention, a program may be stored in a computer-readable recording medium to allow the lane marking detecting method described above to be executed or installed.

DETAILED DESCRIPTION

Figure 1:
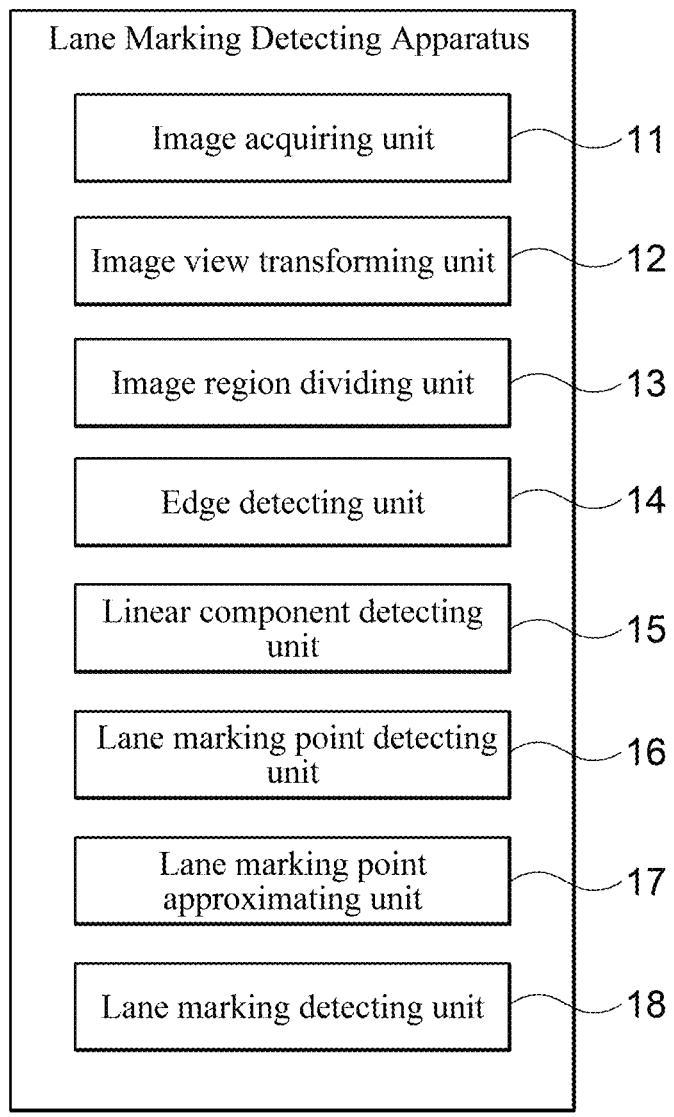
FIG. 1 is a block diagram illustrating a lane marking detecting apparatus according to an exemplary embodiment of the present invention.

The following description illustrates only a principle of the present invention. Therefore, those skilled in the art may implement the principle of the present invention and devise various apparatuses included in the spirit and scope of the present invention although not clearly described or shown in the present specification. In addition, it is to be understood that all conditional terms and exemplary embodiments mentioned in the present specification are obviously intended only to allow those skilled in the art to understand a concept of the present invention in principle, and the present invention is not limited to exemplary embodiments and states particularly mentioned as such.

Further, it is to be understood that all detailed descriptions mentioning specific exemplary embodiments of the present invention as well as principles, aspects, and exemplary embodiments of the present invention are intended to include structural and functional equivalences thereof. Further, it is to be understood that these equivalences include an equivalence that will be developed in the future as well as an equivalence that is currently well-known, that is, all devices devised so as to perform the same function regardless of a structure.

Therefore, it is to be understood that, for example, a block diagram of the present specification shows a conceptual aspect of an illustrative circuit for embodying a principle of the present invention. Similarly, it is to be understood that all flowcharts, state transition views, pseudo-codes, and the like show various processes that may be tangibly embodied in a computer-readable medium and that are executed by computers or processors regardless of whether or the computers or the processors are clearly illustrated.

Functions of various devices including processors or functional blocks represented as concepts similar to the processors and illustrated in the accompanying drawings may be provided by hardware having the capability to execute appropriate software as well as dedicated hardware. When the functions are provided by the processors, the above-mentioned functions may be provided by a single dedicated processor, a single shared processor, or a plurality of individual processors, in which some of them may be shared.

In addition, terms mentioned as a processor, a control, or a concept similar to the processor or the control should not be interpreted to exclusively cite hardware having capability to execute software, but should be interpreted to implicitly include digital signal processor (DSP) hardware and a read only memory (ROM), a random access memory (RAM), and a non-volatile memory for storing software without being limited thereto. The above-mentioned terms may also include well-known other hardware.

In the claims of the present specification, components represented as means for performing functions mentioned in a detailed description are intended to include all methods for performing functions including all types of software including, for example, a combination of circuit devices performing these functions, firmware/micro codes, or the like, and are coupled to appropriate circuits for executing the software. It is to be understood that since functions provided by variously mentioned means are combined with each other and are combined with a scheme demanded by the claims in the inventions defined by the claims, any means capable of providing these functions are equivalent to means recognized from the present specification.

The above-mentioned objects, features, and advantages will become obvious from the following detailed description provided in relation to the accompanying drawings. Therefore, those skilled in the art to which the present invention pertains may easily practice a technical idea of the present invention. Further, in describing the present invention, in the case in which it is judged that a detailed description of a well-known technology associated with the present invention may unnecessarily make unclear the gist of the present invention, it will be omitted.

Hereinafter, various exemplary embodiments of the present invention will be described in detail with reference to the accompanying drawings.

Figure 2:
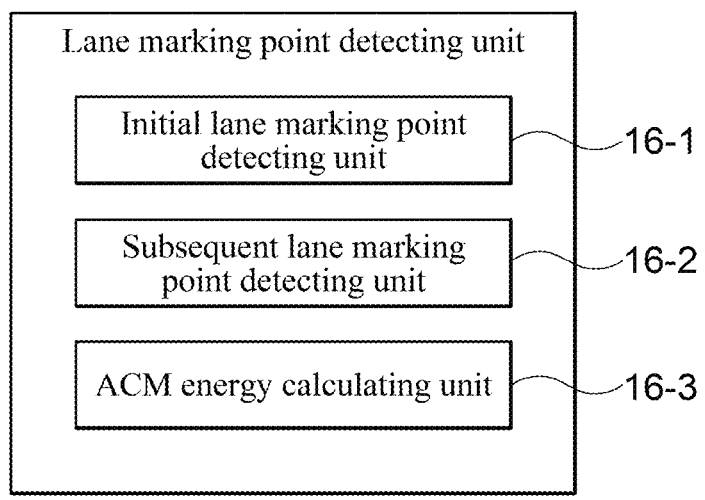
FIG. 2 is a block diagram specifically illustrating a lane marking point detecting unit according to an exemplary embodiment of the present invention.

FIG. 1 is a block diagram illustrating a lane marking detecting apparatus according to an exemplary embodiment of the present invention. FIG. 2 is a block diagram specifically illustrating a lane marking detecting apparatus according to an exemplary embodiment of the present invention. Referring to FIGS. 1 and 2, a lane marking detecting apparatus 10 may include all or some of an image acquiring unit 11, an image view transforming unit 12, an image region dividing unit 13, an edge detecting unit 14, a linear component detecting unit 15, a lane marking point detecting unit 16, a lane marking point approximating unit 17, and a lane marking detecting unit 18. In addition, the lane marking point detecting unit 16 may include an initial lane marking point detecting unit 16-1, a subsequent lane marking point detecting unit 16-2, and an ACM energy calculating unit 16-3.

The lane marking detecting apparatus 10 may detect a lane marking of a lane in which a vehicle is running from a drive image by image processing of the drive image captured by an imaging device of a vehicle.

Here, driving of the vehicle refers to a state in which the vehicle is driven by a driver and located on the road, and may have a concept of including all of a driving state in which the vehicle is running on the road, a stopped state in which the vehicle is standing on the road, and a parking state of the vehicle.

In addition, the drive image captured by the imaging device of the vehicle may include a front drive image according to imaging of a front of the vehicle and a rear drive image according to imaging of a rear of the vehicle.

The lane marking detecting apparatus 10 may be implemented using software, hardware, or a combination thereof. For example, according to hardware implementation, the lane marking detecting apparatus 10 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, micro-processors, and electric units for performing other functions.

Hereinafter, for convenience of description, each component module of the lane marking detecting apparatus 10 will be described in detail based on a case in which the drive image is a front drive image as an example.

The image acquiring unit 11 may acquire a drive image captured by the imaging device of the vehicle. Specifically, the image acquiring unit 11 may acquire, in real time, a drive image captured by the imaging device installed in the vehicle while the vehicle is running.

Here, the acquired drive image may include a plurality of lanes demarcated along a lane marking, a road including a plurality of lanes, and a plurality of vehicles running on the road.

A lane marking may refer to each of both side lines forming a lane in which a vehicle is located. In addition, a lane may refer to a road formed by lane markings such as a primary lane, a secondary lane, or an N lane, in which a vehicle is running.

The acquired drive image may be a color image or a gray scale image.

If the acquired drive image is a color image, the image acquiring unit 11 may generate a gray scale image from the color image through gray scale processing. However, when the acquired drive image is a gray scale processed image, the image acquiring unit 11 may not perform separate gray scale processing.

According to the present invention, an image may be processed in real time even in a low-end terminal by executing a lane detection algorithm to be described later using a gray scale processed image.

However, the present invention is not limited thereto, and when the drive image acquired through the image acquiring unit 11 is a color image, the image acquiring unit 11 may not perform gray scale processing and may execute the lane detection algorithm to be described using the color image, without performing gray scale processing. In this case, according to the present invention, an RGB color space of the color image may be transformed into a CIELUV color space, a YCbCr color space, or an HSV color space, and the lane detection algorithm to be described later may be executed using the color image transformed in the color space.

Hereinafter, for convenience of description, a case in which the drive image is a gray scale processed image will be described as an example.

The image view transforming unit 12 may transform a view of the drive image acquired by the image acquiring unit 11 to generate a view-converted drive image.

As an example, when a view of the imaging device provided in the vehicle faces a front of the vehicle, a drive image obtained by the image acquiring unit 11 may be a front view image corresponding to a view of the imaging device. However, if the lane detection algorithm to be described later is executed through the front view image, accuracy of lane detection may be degraded. Thus, according to the present invention, the image view transforming unit 12 may receive a front view image obtained by the image acquiring unit 11 and transform a view of the received front view image to generate a top view image. Here, the top view image may refer to an image of a view viewed from the top to the bottom.

The image view transforming unit 12 may transform a view of the drive image using a transformation matrix (or a homograph matrix) as shown in Equation 1 below.

$$w \begin{bmatrix} x' \\ y' \\ 1 \end{bmatrix} = \begin{bmatrix} h_{11} & h_{12} & h_{13} \\ h_{21} & h_{22} & h_{23} \\ h_{31} & h_{32} & h_{33} \end{bmatrix} \begin{bmatrix} x \\ y \\ 1 \end{bmatrix}$$ [Equation 1]

Here, W is a weight, (x, y, 1) is an original position, (x',y',1) is a transformation position, and h11 to h33 are a transformation matrix.

That is, the image view transforming unit 12 may generate a top view image by setting a ROI (ROI) of the front view image and applying the transformation matrix to all pixels in the ROI. Here, the ROI may be a preset region or may vary according to specifications of the imaging device.

In addition, the aforementioned transformation matrix may be a matrix whose preset value is assigned to a storage unit. Alternatively, the image view transforming unit 12 may calculate the transformation matrix based on the front view image acquired by the imaging device as the electronic device is turned on, and generate the top view image based on the calculated transformation matrix, and thereafter, when the electric device is turned off, the transformation matrix may be deleted.

The image view transforming unit 12 of the present invention will be described in detail with reference to FIGS. 3A and 3B.

Figure 3A:
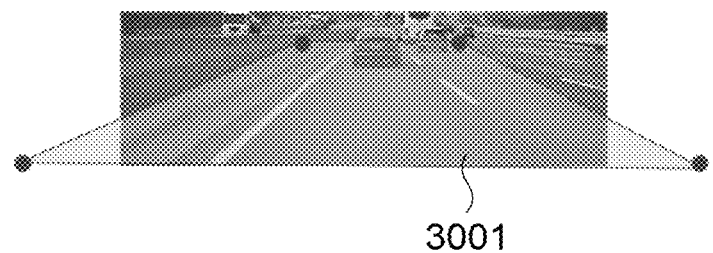
FIGS. 3A and 3B are views illustrating image view transformation according to an exemplary embodiment of the present invention.
Figure 3B:
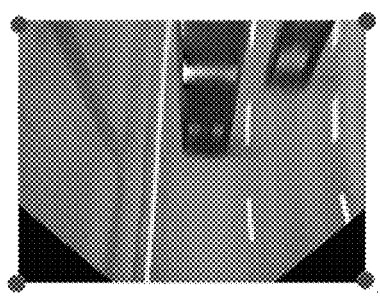

FIGS. 3A and 3B are views illustrating image view transformation according to an exemplary embodiment of the present invention. Referring to FIGS. 3A and 3B, a drive image acquired by the image acquiring unit 11 may be a front view image (see FIG. 3A) corresponding to a view of the imaging device. In this case, the image view transforming unit 12 may select an ROI 3001 from the front view image and apply the selected ROI 3001 to the transformation matrix to generate a top view image which is an image of a view from above (See FIG. 3B).

Meanwhile, the image view transforming unit 12 according to the present invention may generate the front view image from the top view image by inversely applying the aforementioned transformation.

Hereinafter, for convenience of description, a case in which a drive image is a top view image will be described as an example.

The image region dividing unit 13 may divide the top view image generated by the image view transforming unit 12 into a first region and a second region according to a distance from the vehicle. The image region dividing unit 13 will be described in more detail with reference to FIGS. 4A and 4B.

Figure 4A:
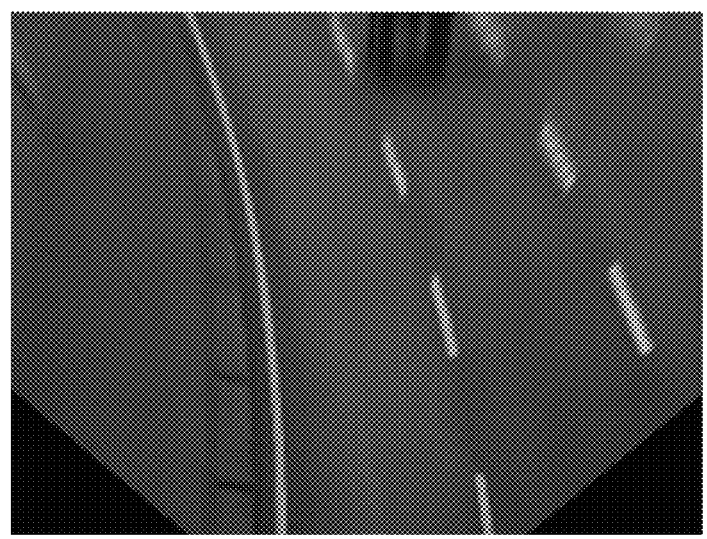
FIGS. 4A and 4B are views illustrating an image region segmentation according to an exemplary embodiment of the present invention.
Figure 4B:
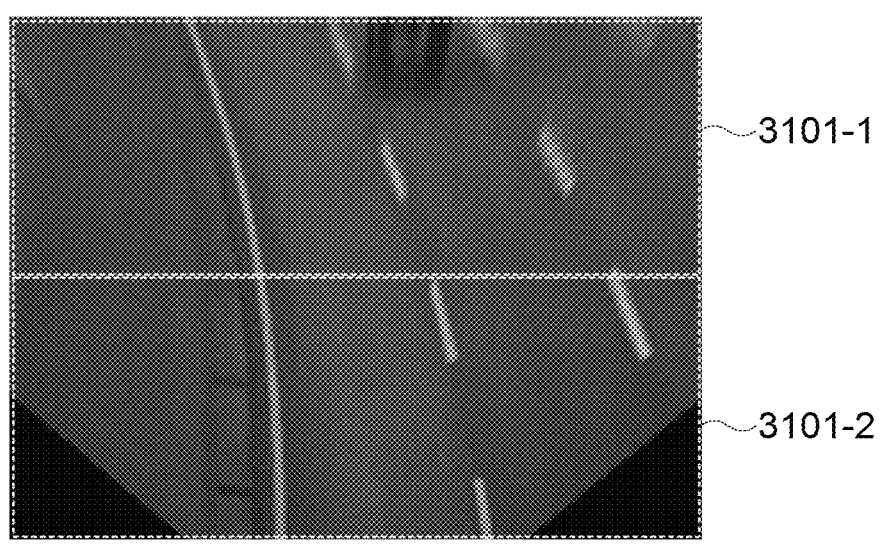

FIGS. 4A and 4B are views illustrating dividing of an image region according to an exemplary embodiment of the present invention. Referring to FIGS. 4A and 4B, a top view image generated by the image view transforming unit 12 may be the same as that of FIG. 4A. The image region dividing unit 13 includes a first region 3101-2 corresponding to a region close to a vehicle according to a distance from the vehicle and a second region 3101-1 corresponding to a region far from the vehicle as shown in FIG. 4B.

The edge detecting unit 14 may detect an edge corresponding to a lane marking in the drive image.

Specifically, the edge detecting unit 14 may detect an edge corresponding to a lane marking in the top view image generated by the image view transforming unit 12. Here, the edge may refer to an edge or an outline and may refer to a portion present at a point where brightness of the image changes from a low value to a high value or vice versa. The edge detecting unit 14 may detect an edge corresponding to a lane marking from the drive image using various techniques, for example, a Sobel edge extraction technique, a Prewitt edge extraction technique, a Roberts edge extraction technique, and a Compass edge extraction technique.

In addition, the edge detecting unit 14 may generate an edge image based on the detected edge. Here, the edge image generated by the edge detecting unit 14 may be an image in which a detected edge region is separated from a non-edge region. This edge image will be described later with reference to FIGS. 6A and 6B.

The linear component detecting unit 15 may detect a linear component based on the edge detected by the edge detecting unit 14. Specifically, the linear component detecting unit 15 may detect a linear component from an edge included in each of the first region and the second region by applying a linear component detection algorithm to the edge image of each of the first region and the second region divided by the image region dividing unit 13. Here, since the linear component detecting unit 15 detects a linear component for each of the first region 3101-2 corresponding to a close region and the second region 3101-1 corresponding to a distant region, among the regions divided by the image region dividing unit 13, a curve corresponding to a curve lane marking may be expressed.

In addition, the linear component detecting unit 15 may detect a linear component based on an edge detected by the edge detecting unit 14 using, for example, a Hough transform. In addition, there may be at least one linear component detected by the linear component detecting unit 15.

In addition, the linear component detecting unit 15 may generate an edge linear processed image based on the detected linear component. Here, the linear edge processed image generated by the linear component detecting unit 15 may be an image in which the detected linear component region is distinguished from other regions. The linearly processed edge image will be described later with reference to FIGS. 6A and 6B.

Meanwhile, an operation of the linear component detecting unit will be described in more detail with reference to FIGS. 5A and 5B.

Figure 5A:
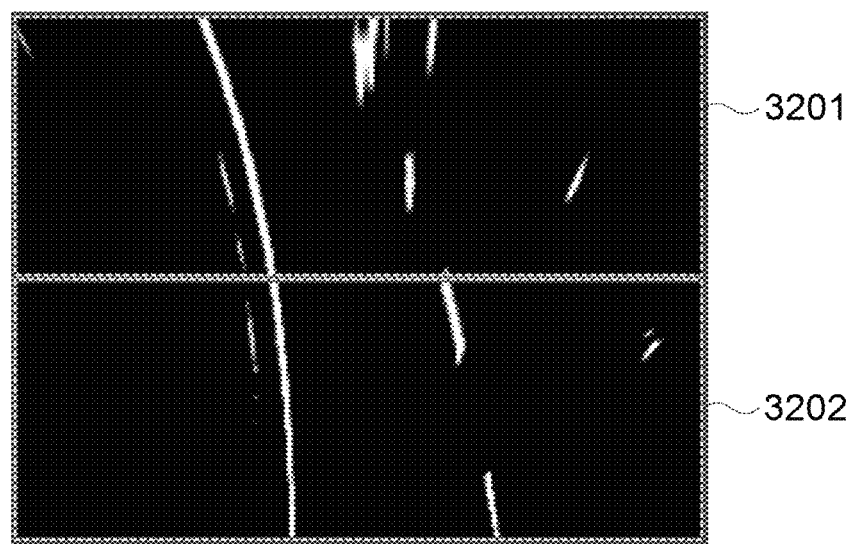
FIGS. 5A and 5B are views illustrating a process of detecting a linear component according to an exemplary embodiment of the present invention.
Figure 5B:
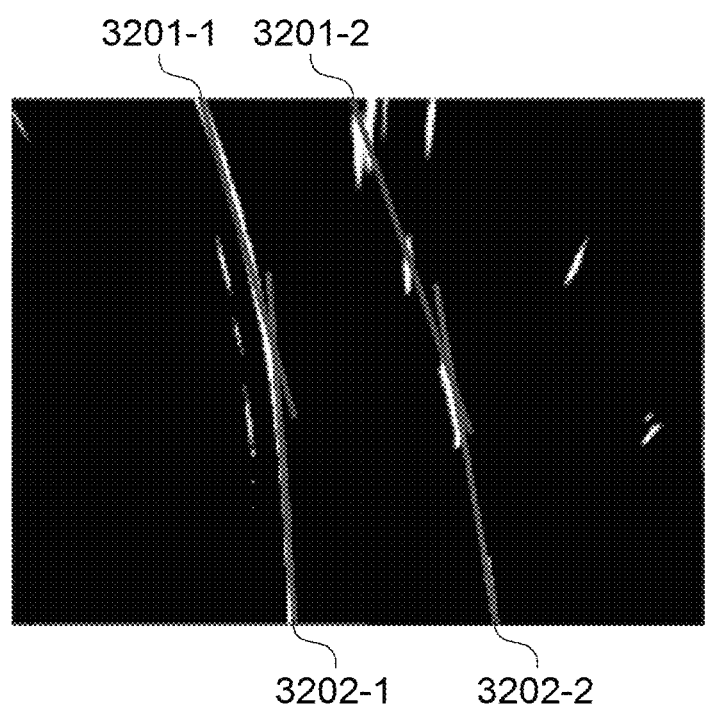

FIGS. 5A and 5B are views illustrating a linear component detection process according to an exemplary embodiment of the present invention. FIG. 5A is an edge image generated by the edge detecting unit 14, and the linear component detecting unit 15 may apply Hough transform to a first edge image 3201 corresponding to the first region divided by the image region dividing unit 13 and a second edge image 3202 corresponding to the second region. In this case, as shown in FIG. 5B, the linear component detecting unit 15 may detect first linear components 3201-1 and 3201-2 from the edge included in the first edge image 3201 and detect second linear components 3202-1 and 3202-2 from the edge included in the second edge image 3202.

Figure 6A:
FIGS. 6A and 6B are views illustrating an edge image and a linearly processed edge image according to an exemplary embodiment of the present invention.
Figure 6B:
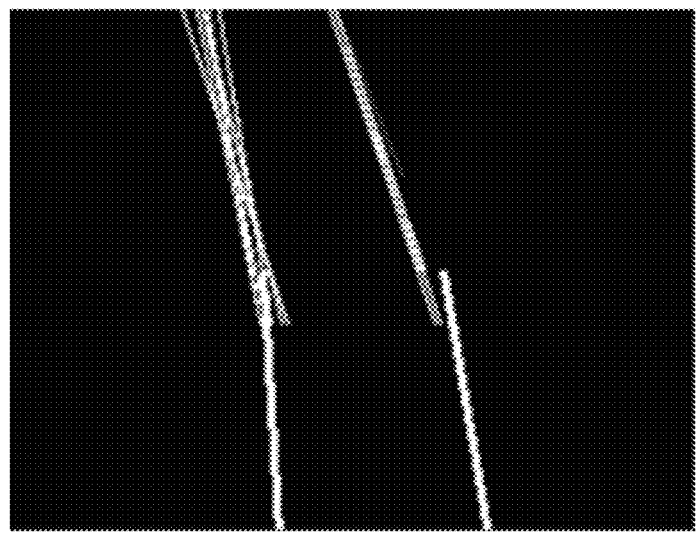

FIGS. 6A and 6B are views illustrating an edge image and a linearly processed edge image according to an exemplary embodiment of the present invention. The edge detecting unit 14 may generate an edge image based on the detected edge. Referring to FIG. 6A, the edge image generated by the edge detecting unit 14 may include a detected edge region (white display region) and a non-edge region (black display area), and the edge region in the edge image may be distinguished from the non-edge region.

In addition, the linear component detecting unit 15 may generate a linearly processed edge image based on the linear component detected from the edge image. Referring to FIG. 6B, the linearly processed edge image generated by the linear component detecting unit 15 may include a detected linear component region (white display region) and other regions (black display regions), and in the linearly processed edge image, the linear component region may be distinguished from other regions.

Meanwhile, the lane marking point detecting unit 16 may detect a lane marking point corresponding to a lane marking using the generated edge image and the linearly processed edge image.

Since a lane in which a vehicle is running generally includes a left lane marking and a right lane marking, the lane marking point detecting unit 16 may detect a lane marking point corresponding to the left line marking and a line marking point corresponding to the right lane marking using the generated edge image and the linearly processed edge image.

However, the present invention is not limited thereto, and when the lane in which the vehicle is running includes only one lane marking, the lane marking point detecting unit 16 may detect only a lane marking point corresponding to one side lane marking using the generated edge image and the linearly processed edge image.

Here, the lane marking point detecting unit 16 may include an initial lane marking point detecting unit 16-1, a subsequent lane marking point detecting unit 16-2, and an ACM energy calculating unit 16-3.

The initial lane marking point detecting unit 16-1 may determine an initial lane marking point using at least one of the edge image generated by the edge detecting unit 14 and the linearly processed edge image generated by the linear component detecting unit 15. Specifically, the initial lane marking point detecting unit 16-1 may detect two or more points at which a brightness value is maximized at a lower end of at least one of the edge image and the linearly processed edge image, determine, as a left initial lane marking point, a point at which a left brightness value is maximized among the points, and determine, as a right initial lane marking point, a point at which a right brightness value is maximized among the points. A method of determining such an initial lane marking point will be described in more detail with reference to FIG. 7.

Figure 7:
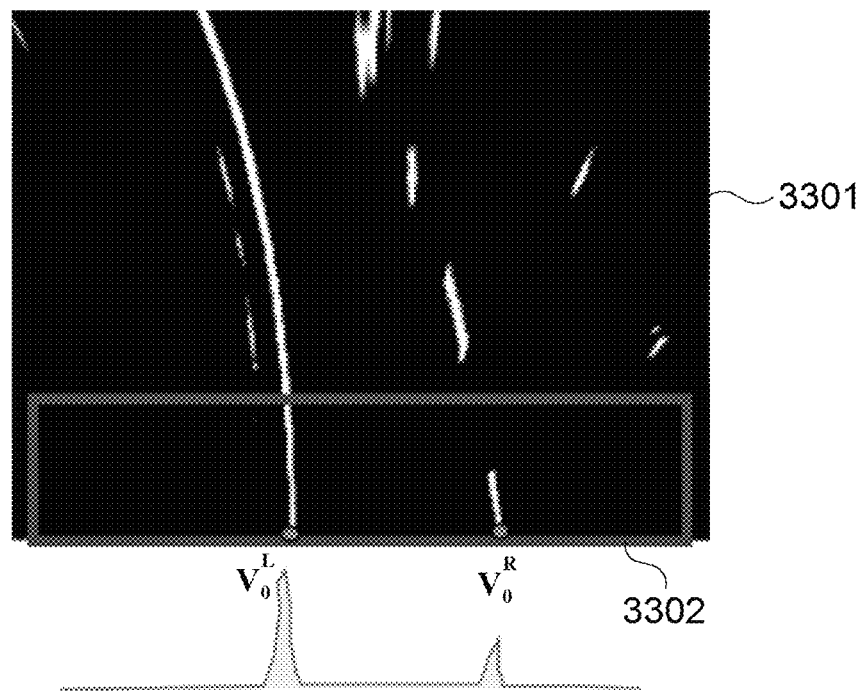
FIG. 7 is a view illustrating initial lane marking point determination according to an exemplary embodiment of the present invention.

FIG. 7 is a view illustrating determining of an initial lane marking point according to an exemplary embodiment of the present invention. Referring to FIG. 7, the initial lane marking point detecting unit 16-1 may determine an initial lane marking point using an edge image 3301. The initial lane marking point detecting unit 16-1 may set a lower end portion 3302 of the edge image 3301, analyze a histogram of the lower end portion 3302 to detect two or more points at which a brightness value is maximized, determine a left initial lane marking point $V_1^L$ at which a left brightness value is maximized among the points, and determine a right initial lane marking point $V_1^R$ at which a right brightness value among the points is maximized.

Meanwhile, in FIG. 7, the initial lane marking point detecting unit 16-1 has been described as an example of detecting the initial lane marking point by analyzing the edge image generated by the edge detecting unit 14, but is not limited thereto. According to another exemplary embodiment of the present invention, an initial lane marking point may be detected by analyzing the linearly processed edge image generated by the linear component detecting unit 15. Alternatively, an average position of the initial lane marking point detected from the edge image and the initial lane marking point detected from the linearly processed edge image may be detected as the initial lane marking point.

Meanwhile, when the initial lane marking point is determined, the subsequent lane marking point detecting unit 16-2 may generate a search window, apply the generated search window to each of the edge image and the linearly processed edge image, and determine a point satisfying a preset condition within the applied search window as a subsequent lane marking point. In this case, the subsequent lane marking point detecting unit 16-2 may determine a plurality of subsequent lane marking points by sequentially generating and applying a search window from the bottom to the top of each of the edge image and the linearly processed edge image.

Specifically, the subsequent lane marking point detecting unit 16-2 may generate a first search window based on the determined initial lane marking point and determine a first subsequent lane marking point that satisfies the preset condition by applying the generated first search window to each of the edge image and the linearly processed edge image. In addition, the subsequent lane marking point detecting unit 16-2 may generate a second search window in which the column in which the first subsequent lane marking point is located in the first search window is a center column, and determine a second subsequent lane marking point satisfying a preset condition by disposing the generated second search window above the first search window and applying the second search window to each of the edge image and the linearly processed edge image. Also, the subsequent lane marking point detecting unit 16-2 may sequentially generate third, fourth, . . . , nth search windows until the ends of the edge image and the linearly processed edge image in the same manner as the generating of the second search window, and determine a plurality of subsequent lane marking points by sequentially applying the plurality of sequentially generated third, fourth, . . . , Nth search windows up to the upper ends of the edge image and the linearly processed edge image.

Here, the search window applied to the edge image and the search window applied to the linearly processed edge image may have the same size and may be search windows disposed at the same position in each image.

In addition, the preset condition may be a condition for determining a point that minimizes an energy value of an active contour model (ACM) as a subsequent line point.

The ACM is a model that searches for a contour by repeatedly performing a process of minimizing internal energy and external energy, and may include internal energy and external energy.

The ACM energy calculating unit 16-3 according to the present invention may calculate an energy value of the ACM based on Equation 2 below.

$$E_{ACM}(v) = \sum_{i=1}^{n} (E_{int}(v_i) - (1.2) \times E_{ext}(v_i)) \quad \text{[Equation 2]}$$

Here, $E_{int}$ may denote an internal energy value, $E_{ext}$ may denote an external energy value, and $E_{ACM}$ may denote an ACM energy value.

Internal energy

Specifically, the ACM energy calculating unit 16-3 may calculate an internal energy value using an average distance between previous points and a distance between a current point and a previous point. Here, when the distance between the current lane marking point and the previous lane marking point is close to the average distance between the previous lane marking points, the internal energy may be reduced and converged. Specifically, the ACM energy calculating unit 16-3 may calculate the internal energy value based on Equation 3 below.

$$E_{int}(v_i) = \frac{|\overline{D_{i-1}} - \|v_i - v_{i-1}\||}{\overline{D_{i-1}}} \quad \text{[Equation 3]}$$

Here, $v_i$ denotes an i-th lane marking point vector, and $\overline{D_{i-1}}$ denotes an average distance between lane marking points to an i−1 th. Here, i may be 0 as an initial lane marking point, and 1, 2, . . . , n may be sequentially allocated to subsequent lane marking points.

External energy

Specifically, the ACM energy calculating unit 16-3 may calculate an external energy value using brightness values of lane marking points detected from each of the edge image and the linearly processed edge image as shown in Equation 4 below. In particular, in the case of calculating the external energy using only the edge energy, the lane marking point cannot be accurately detected. Thus, according to the present invention, the external energy is calculated using both the linearly processed edge image and the edge image but applying a larger weight to the linearly processed edge image, thereby more accurately detecting a lane marking point.

$$E_{ext}(v_i) = (0.2) \times \left|\frac{f_{edge}(v_i)}{fE_{max}}\right| + (0.8) \times \left|\frac{f_{hough}(v_i)}{fH_{max}}\right| \quad \text{[Equation 4]}$$

Here, $f_{edge}(v_i)$ may refer to a brightness value (value: 0-255) of the edge image at an i-th lane marking point, $f_{hough}(v_i)$ may refer to a brightness value (value: 0-255) of the linearly processed edge image at the i-th lane marking point, $f_{Emax}$ may refer to a maximum brightness value (value: 255) of the edge image, and $f_{Hmax}$ may refer to a maximum brightness value (value: 255) of the linearly processed edge image.

Hereinafter, a method for detecting a subsequent lane marking point using the ACM will be described in more detail with reference to FIG. 8.

Figure 8:
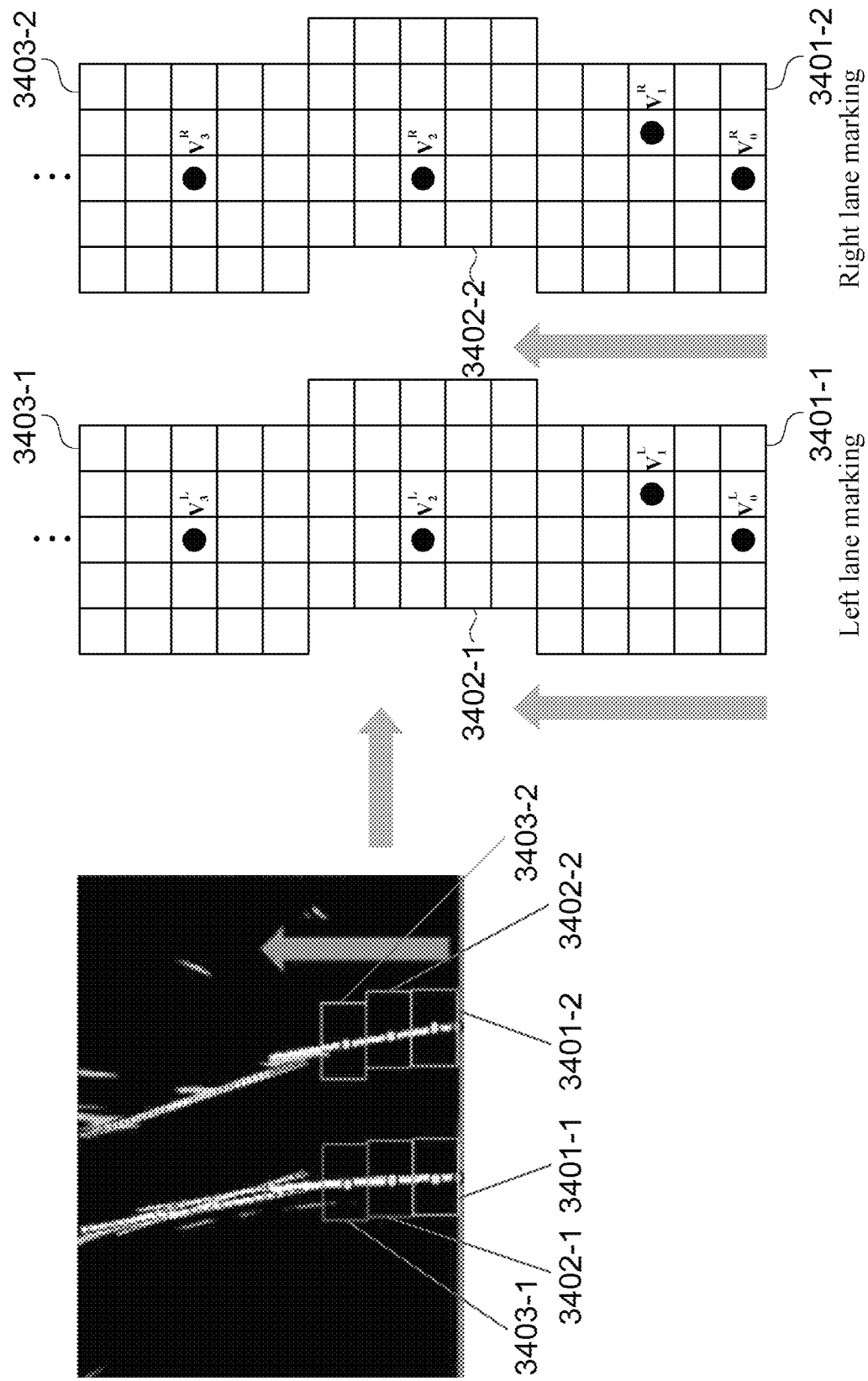
FIG. 8 is a view illustrating a method of determining a subsequent lane marking point according to an exemplary embodiment of the present invention.

FIG. 8 is a view illustrating a method of detecting a subsequent lane marking point according to an exemplary embodiment of the present invention. Referring to FIG. 8, when the initial lane marking point detecting unit 16-1 detects the initial lane marking points $V_0^L$ and $V_0^R$, the subsequent lane marking point detecting unit 16-2 may generate first search windows 3401-1 and 3401-2 based on the initial lane marking point. Here, the first search windows 3401-1 and 3401-2 may be arranged to be located at the center of the last row of the first search windows 3401-1 and 3401-2.

Also, the subsequent lane marking point detecting unit 16-2 may calculate an internal energy value and an external energy value based on the above Equation for each pixel of the first search windows 3401-1 and 3401-2 by applying the generated first search windows 3401-1 and 3401-2 to each of the edge image and the linearly processed edge image. Further, the subsequent lane marking point detecting unit 16-2 may calculate an ACM energy value for each pixel of the first search window 3401 by applying the calculated internal energy value and the external energy value to Equation 2 described above. In addition, the subsequent lane marking point detecting unit 16-2 may detect a point at which the calculated ACM energy value is minimized as first subsequent lane marking points $V_1^L$ and $V_1^R$.

Thereafter, the subsequent lane marking point detecting unit 16-2 may generate second search windows 3402-1 and 3402-2*a* in which a row in which the first subsequent lane marking points $V_1^L$ and $V_1^R$ are located in the first search windows 3401-1 and 3401-2 as a center column. In addition, the subsequent lane marking point detecting unit 16-2 may arrange the generated second search windows 3402-1 and 3402-2 above the first search windows 3401-1 and 3401-2. In this case, the subsequent lane marking point detecting unit 16-2 may arrange the second search windows 3402-1 and 3402-2 above the first search windows 3401-1 and 3401-2 at positions that overlap portions of the first search windows 3401-1 and 3401-2 or may arrange the second search windows 3402-1 and 3402-2 above the first search windows 3401-1 and 3401-2 at positions that do not overlap.

Thereafter, the subsequent lane marking point detecting unit 16-2 may calculate an internal energy value and an external energy value based on the aforementioned equation for each pixel of the second search windows 3402-1 and 3402-2 by applying the generated second search windows 3402-1 and 3402-2 to the edge image and the linearly processed edge image, respectively. Also, the subsequent lane marking point detecting unit 16-2 may calculate an ACM energy value for each pixel of the second search window 3402-1 and 3402-2 by applying the calculated internal energy value and the external energy value to Equation 2 above. In addition, the subsequent lane marking point detecting unit 16-2 may detect a point at which the calculated ACM energy value is minimized, as the second subsequent lane marking points $V_2^L$ and $V_2^R$.

Here, the expression "second" of the second search window and the second subsequent lane marking point is used to distinguish the first search window from the first subsequent lane marking point, and the second search window and the second subsequent lane marking point may be a concept including all search windows after the first search window and all lane marking points after the first subsequent lane marking point.

That is, the subsequent lane marking point detecting unit 16-2 according to an exemplary embodiment of the present invention may set a plurality of second search windows 3403-1, 3403-2, . . . , 340N-1, 340N-2 and detect a plurality of second subsequent lane marking points $V_3^L$, $V_3^R$, . . . , $V_N^L$, $V_N^R$ by repeating the process of setting the aforementioned second search window and detecting the second subsequent lane marking point.

Meanwhile, the search window applied to the edge image and the search window applied to the linearly processed edge image may have the same size and may be search windows disposed at the same position in each image.

In addition, the aforementioned search window may have a preset size, and the lane marking point detecting unit 16 may detect a lane marking point by applying the search window having the preset size. For example, as shown in FIG. 8, a size of the search window may be previously set to 5 pixels in width and 5 pixels in length.

However, the present invention is not limited thereto, and the size of the search window of the lane marking point detecting unit 16 according to an exemplary embodiment of the present invention may be adaptively changed to detect a lane marking point. As an example, the lane marking point detecting unit 16 according to an exemplary embodiment of the present invention may adaptively vary the size of the search window according to an inclination of the linear component of the linearly processed edge image generated by the linear component detecting unit 15.

That is, in a curve section, as a radius of curvature of a curve decreases, a risk of the curve increases and the inclination of the linear component corresponding to the curve lane marking may decrease. Accordingly, as the inclination of the linear component decreases, the lane marking point detecting unit 16 may increase a row size of the search window so that a wider region may be searched to the left and right.

Meanwhile, according to the present invention, the subsequent lane marking point determining unit 16-2 may detect a point that satisfies a preset condition only in a middle row of the first search window and the second search window. That is, according to the present invention, by detecting a point that satisfies a preset condition only in pixels in the middle row of the search window, without calculating an ACM for all pixels of the search window, an operation processing rate may be increased so that image processing may be performed in real time even at a low-end terminal.

Figure 9:
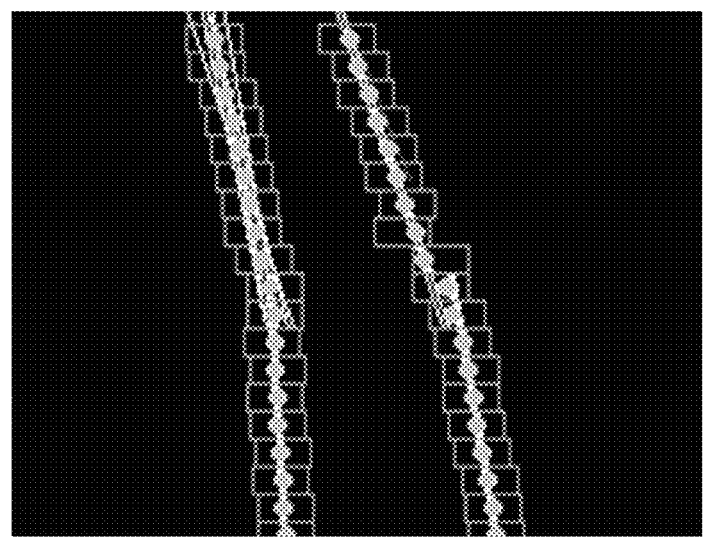
FIG. 9 is a view illustrating a result of detecting a lane marking point according to an exemplary embodiment of the present invention.

FIG. 9 is a diagram illustrating a result of detecting a lane marking point according to an exemplary embodiment of the present invention. Referring to FIG. 9, the subsequent lane marking point detecting unit 16-2 may generate a search window, apply the generated search window to each of the edge image and the linearly processed edge image, and detect all subsequent lane marking points satisfying a preset condition from the applied search window.

Meanwhile, the lane marking point approximating unit 17 may calculate a curve equation formed by the detected lane marking points, and approximate (fit) the lane marking points to a curve based on the calculated curve equation.

That is, when the lane marking points detected by the lane marking point detecting unit 16 are connected as they are, a shape thereof may be different from an actual curve. Accordingly, the lane marking point approximating unit 17 according to the present invention may calculate a curve equation by calculating the coefficients a, b, and c of the quadratic equation described in Equation 5 below, and approximate the lane marking points to a curve by applying all the detected lane marking points to the calculated curve equation.

$$x = ay^2 + by + c \quad \text{[Equation 5]}$$

The lane marking detecting unit 18 may detect a lane marking based on the lane marking points detected by the lane marking point detecting unit 16. Specifically, the lane marking detecting unit 18 may detect lane marking points of a front view image corresponding to the lane marking points of the top view image by transforming the lane marking points detected from the top view image into a view of an acquired drive image (here, the drive image is a front view image). Here, the lane marking points detected from the top view image may be lane marking points detected by the lane marking point detecting unit 16 or lane marking points curve-approximated by the lane marking point approximating unit 17. In addition, the transformation from the view of the top view image to the view of the front view image may be performed using a transformation matrix of the image view transforming unit 12.

In addition, the lane marking detecting unit 18 may detect a lane marking from lane marking points of the front view image.

The operation of the lane marking detecting unit 18 will be described in more detail with reference to FIGS. 10A, 10B, and 10C.

Figure 10A:
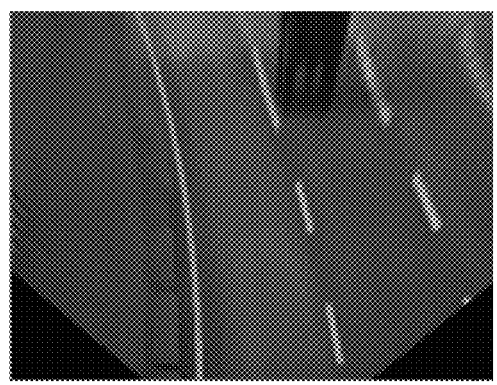
FIGS. 10A, 10B, and 10C are views illustrating a process of detecting a lane from a front view image using a top view image according to an exemplary embodiment of the present invention.
Figure 10B:
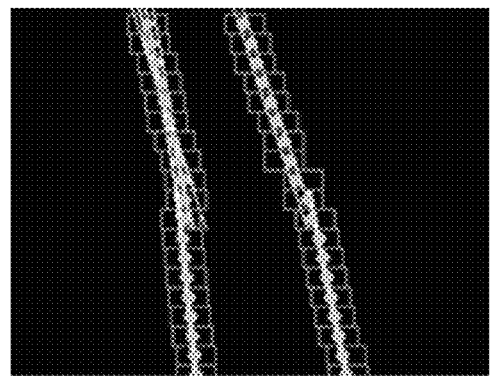
Figure 10C:
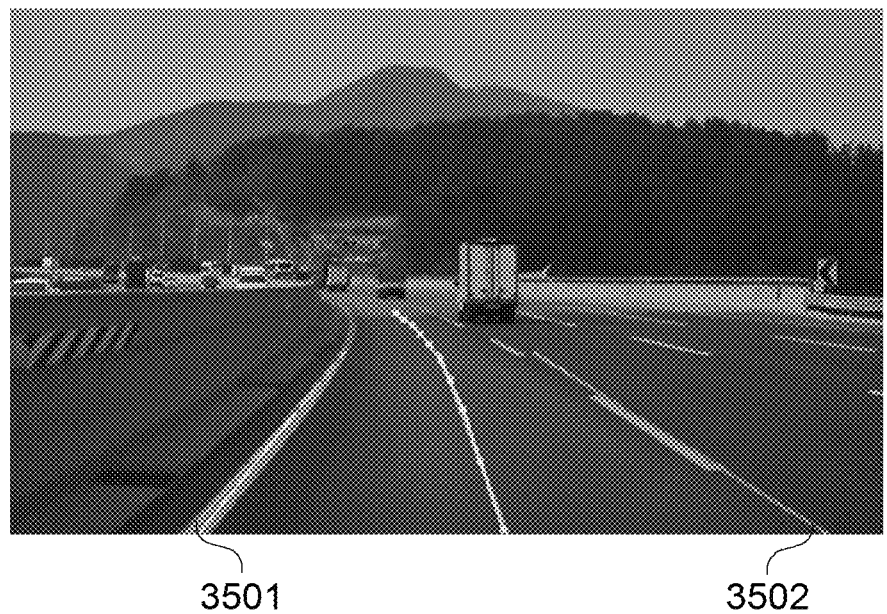

FIGS. 10A, 10B, and 10C are views illustrating a process of detecting a lane marking from a front view image using a top view image according to an exemplary embodiment of the present invention. Referring to FIGS. 10A, 10B, and 10C, the image view transforming unit 12 may generate a top view image as shown in FIG. 10A from a front view image. In addition, the lane marking point detecting unit 16 may detect all lane marking points as shown in FIG. 10B using the top view image.

Meanwhile, when all the lane marking points are detected, the lane marking detecting unit 18 may detect lane marking points of the front view image corresponding to the lane marking points of the top view image by transforming the lane marking points detected from the top view image into a view of the front view image as shown in FIG. 10C. Also, the lane marking detecting unit 18 may detect the lane markings 3501 and 3502 from the left and right lane marking points of the front view image.

Hereinafter, a lane marking detecting method according to an exemplary embodiment of the present invention will be described in more detail with reference to FIGS. 11 to 13.

Figure 11:
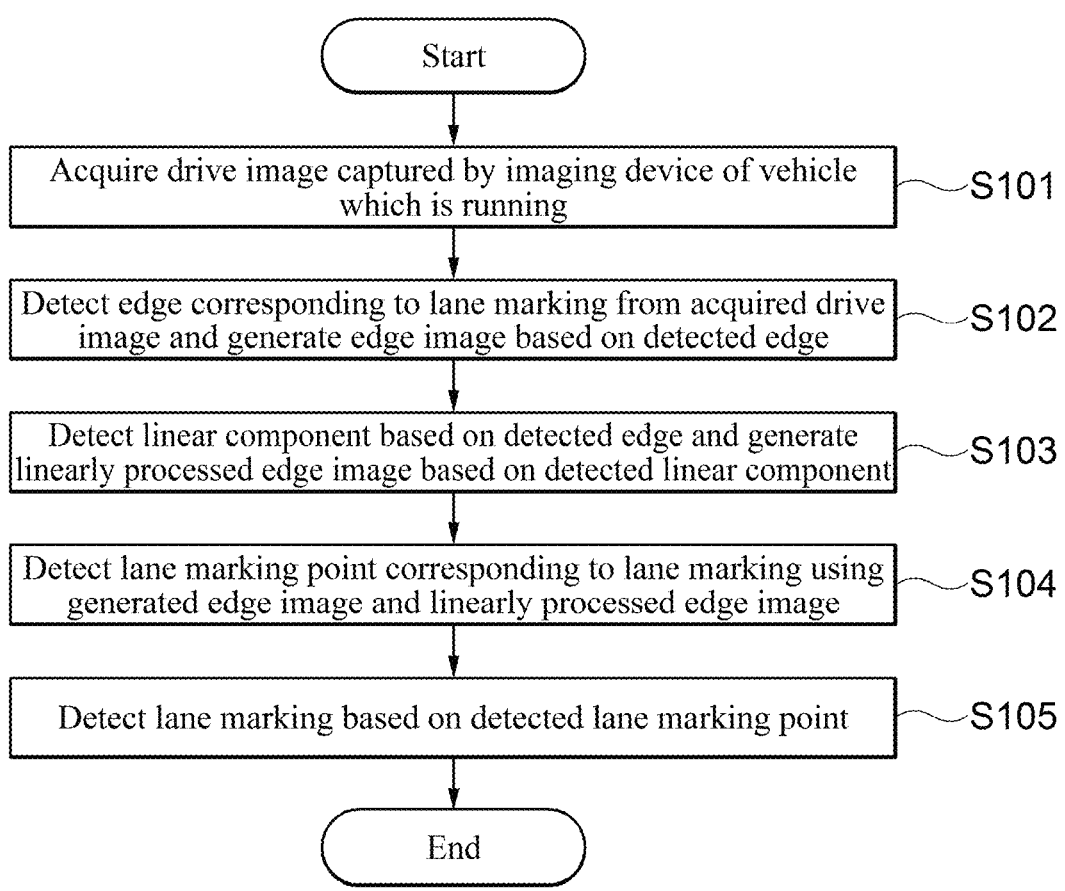
FIG. 11 is a flowchart illustrating a method of detecting a lane marking according to an exemplary embodiment of the present invention.

FIG. 11 is a flowchart illustrating a lane marking detecting method according to an exemplary embodiment of the present invention. Referring to FIG. 11, a lane marking detecting apparatus may acquire a drive image captured by an imaging device of a vehicle which is running (S101).

In addition, the lane marking detecting apparatus may detect an edge corresponding to a lane marking in the acquired drive image and generate an edge image based on the detected edge (S102).

In addition, the lane marking detecting apparatus may detect a linear component based on the detected edge and generate a linearly processed edge image based on the detected linear component (S103).

The lane marking detecting apparatus may detect a lane marking point corresponding to a lane marking using the generated edge image and the linearly processed edge image (S104).

Also, the lane marking detecting apparatus may detect a lane based on the detected lane marking point (S105).

Figure 12:
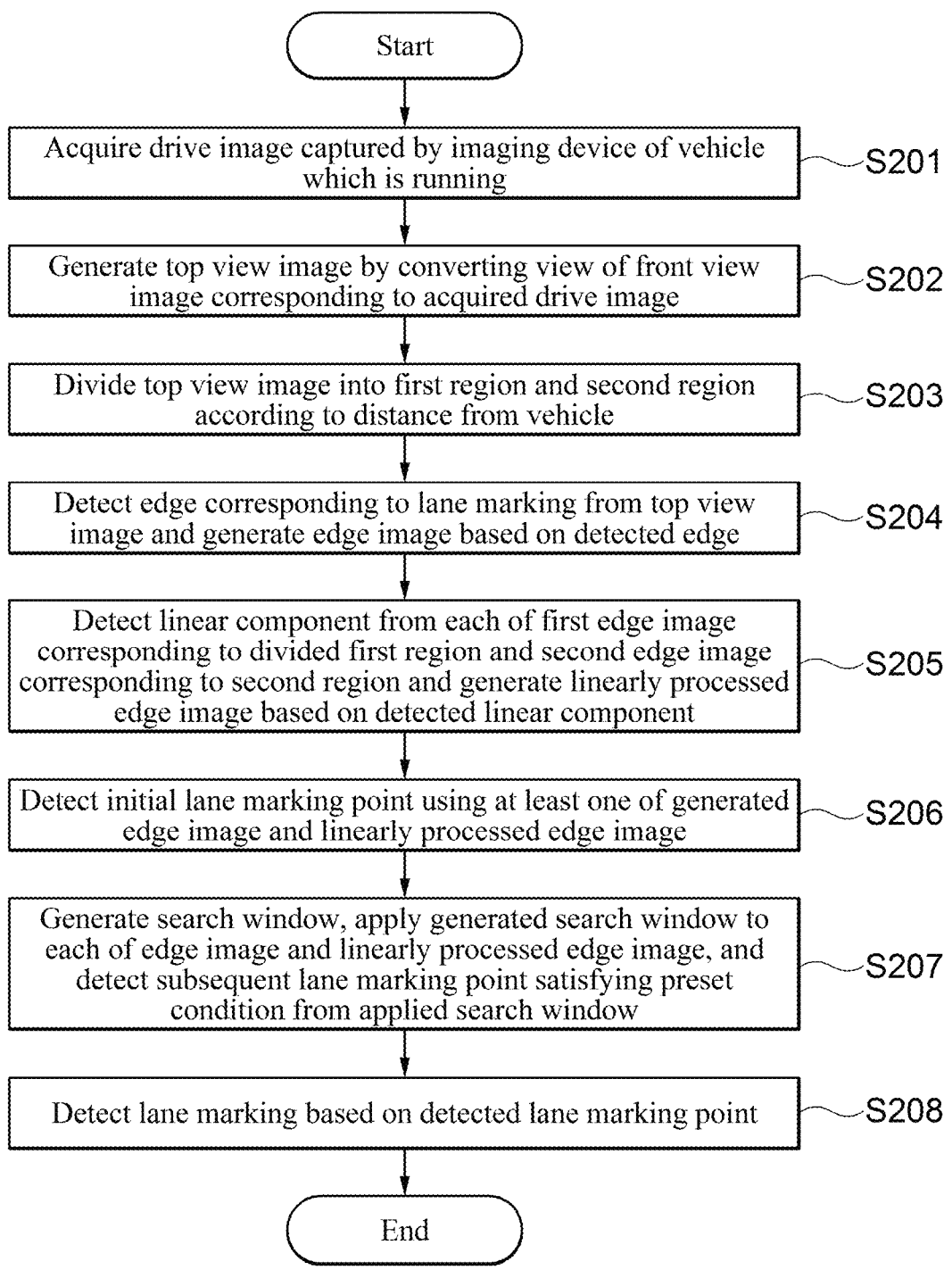
FIG. 12 is a flowchart specifically illustrating a lane marking detecting method according to an exemplary embodiment of the present invention.

FIG. 12 is a flowchart specifically illustrating a method for detecting a lane marking according to an exemplary embodiment of the present invention. Referring to FIG. 12, the lane marking detecting apparatus may acquire a drive image captured by an imaging device of a running vehicle (S201).

In addition, the lane marking detecting apparatus may generate atop view image by transforming a view of a front view image corresponding to the acquired drive image (S202).

In addition, the lane marking detecting apparatus may divide the top view image into a first region and a second region according to a distance from the vehicle (S203).

In addition, the lane marking detecting apparatus may detect an edge corresponding to a lane from the top view image and generate an edge image based on the detected edge (S204).

In addition, the lane marking detecting apparatus may detect a linear component from each of a first edge image corresponding to the divided first region and a second edge image corresponding to the second region, and generate a linearly processed edge image based on the detected linear component (S205).

In addition, the lane marking detecting apparatus may detect an initial lane marking point using at least one of the generated edge image and the linearly processed edge image (S206).

In addition, the lane marking detecting apparatus may generate a search window, apply the generated search window to each of the edge image and the linearly processed edge image, and detect a subsequent lane marking point that satisfies a preset condition from the applied search window (S207).

Then, the lane marking detecting apparatus may detect a lane based on the detected lane marking point (S208).

Figure 13:
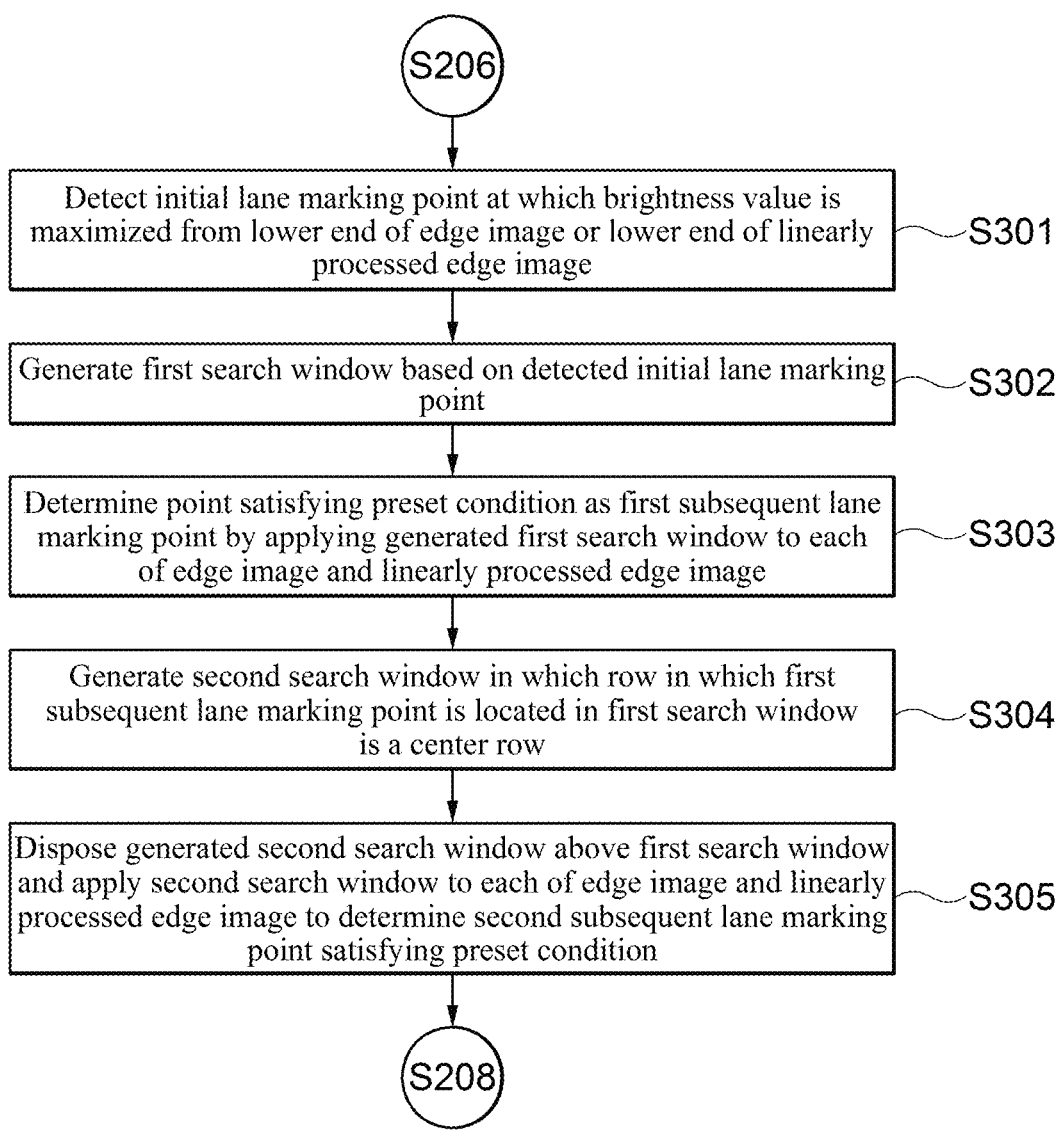
FIG. 13 is a flowchart more specifically illustrating steps of detecting lane marking points (S206 and S207) according to an exemplary embodiment of the present invention.

FIG. 13 is a flowchart specifically illustrating lane marking point detecting steps (S206, S207) according to an exemplary embodiment of the present invention. Referring to FIG. 13, first, the lane marking detecting apparatus may detect an initial lane marking point at which a brightness value is maximized at a lower end of the edge image or the linearly processed edge image (S301).

In addition, the lane marking detecting apparatus may generate a first search window based on the detected initial lane marking point (S302).

The lane marking detecting apparatus may apply the generated first search window to each of the edge image and the linearly processed edge image to determine a point that satisfies a preset condition as a first subsequent lane marking point (S303).

In addition, the lane marking detecting apparatus may generate a second search window in which a column in which the first subsequent lane marking point is located in the first search window is a center column (S304).

Further, the lane marking detecting apparatus may dispose the generated second search window above the first search window and determine a second subsequent lane marking point that satisfies a preset condition by applying the generated second search window to each of the edge image and the linearly processed edge image (S305).

Here, the preset condition may be a lane marking point that minimizes an energy value of an active contour model (ACM). Specifically, step S305 may include calculating an internal energy value using an average distance between previous lane marking points and a distance between a current lane marking point and a previous lane marking point, and calculating an external energy value using brightness values of the lane marking points detected from each of the edge image and the linearly processed edge image.

Meanwhile, the lane marking detecting apparatus according to the present invention may detect all lane marking points by repeatedly performing steps S304 and S305 up to the tops of the edge image and the linearly processed edge image.

In addition, when the aforementioned lane marking point is detected, a lane marking point corresponding to a left lane marking and a lane marking point corresponding to a right lane marking may be detected, respectively.

In addition, the lane marking detecting apparatus may detect a point that satisfies a preset condition only in a middle row of the search window.

In addition, a row size of the search window may be adaptively changed according to an inclination of the linear component.

Figure 14:
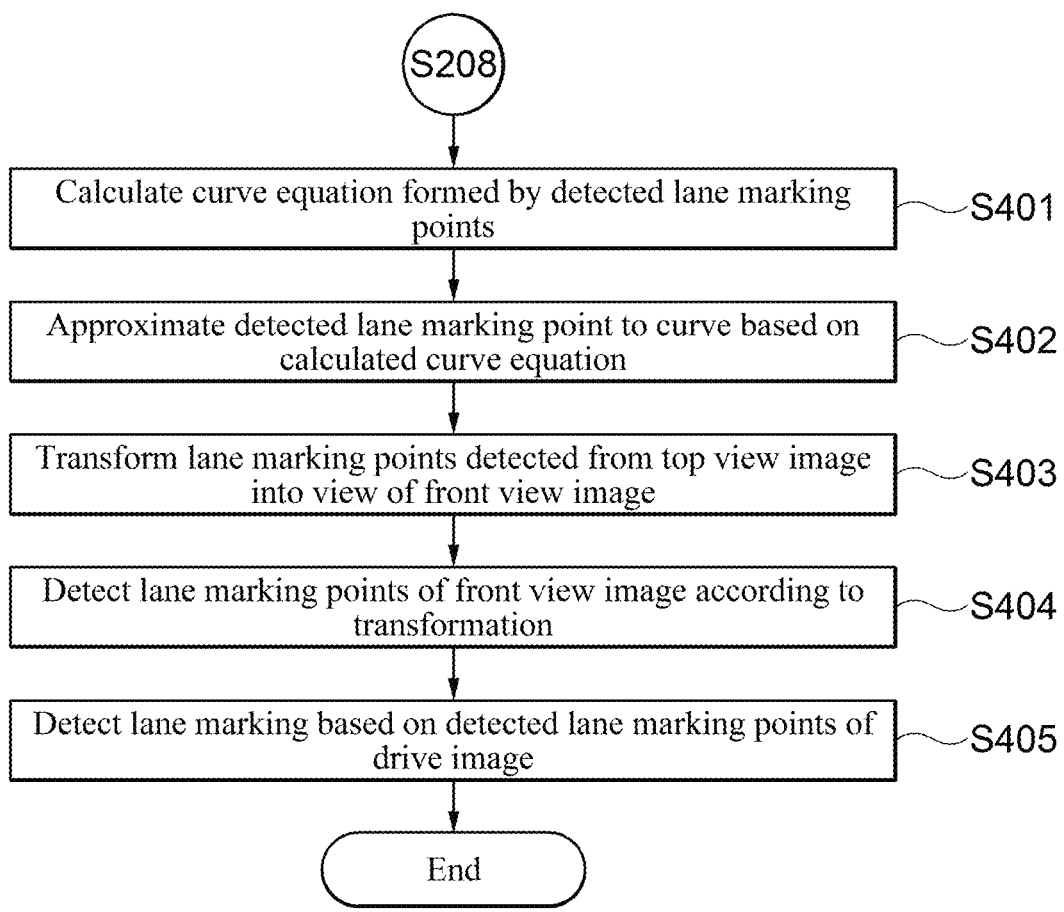
FIG. 14 is a flowchart specifically illustrating a lane marking detecting step S208 according to an exemplary embodiment of the present invention.

FIG. 14 is a flowchart specifically illustrating a lane detection step (S208) according to an exemplary embodiment of the present invention. Referring to FIG. 14, the lane marking detecting apparatus may calculate a curve equation formed by detected lane marking points (S401).

Also, the lane marking detecting apparatus may approximate the detected lane marking point to a curve based on the calculated curve equation (S402).

In addition, the lane marking detecting apparatus may transform lane marking points detected from a top view image into a view of the front view image (S403).

In addition, the lane marking detecting apparatus may detect lane marking points of the front view image according to the transformation (S404).

In addition, the lane marking detecting apparatus may detect a lane marking based on the lane marking points of the detected drive image (S405).

Meanwhile, the lane marking detecting apparatus 10 may be implemented as a module of an electronic device that outputs various guide information for assisting the driver's driving and may perform a route guidance function. This will be described in more detail with reference to FIGS. 15 to 22.

Figure 15:
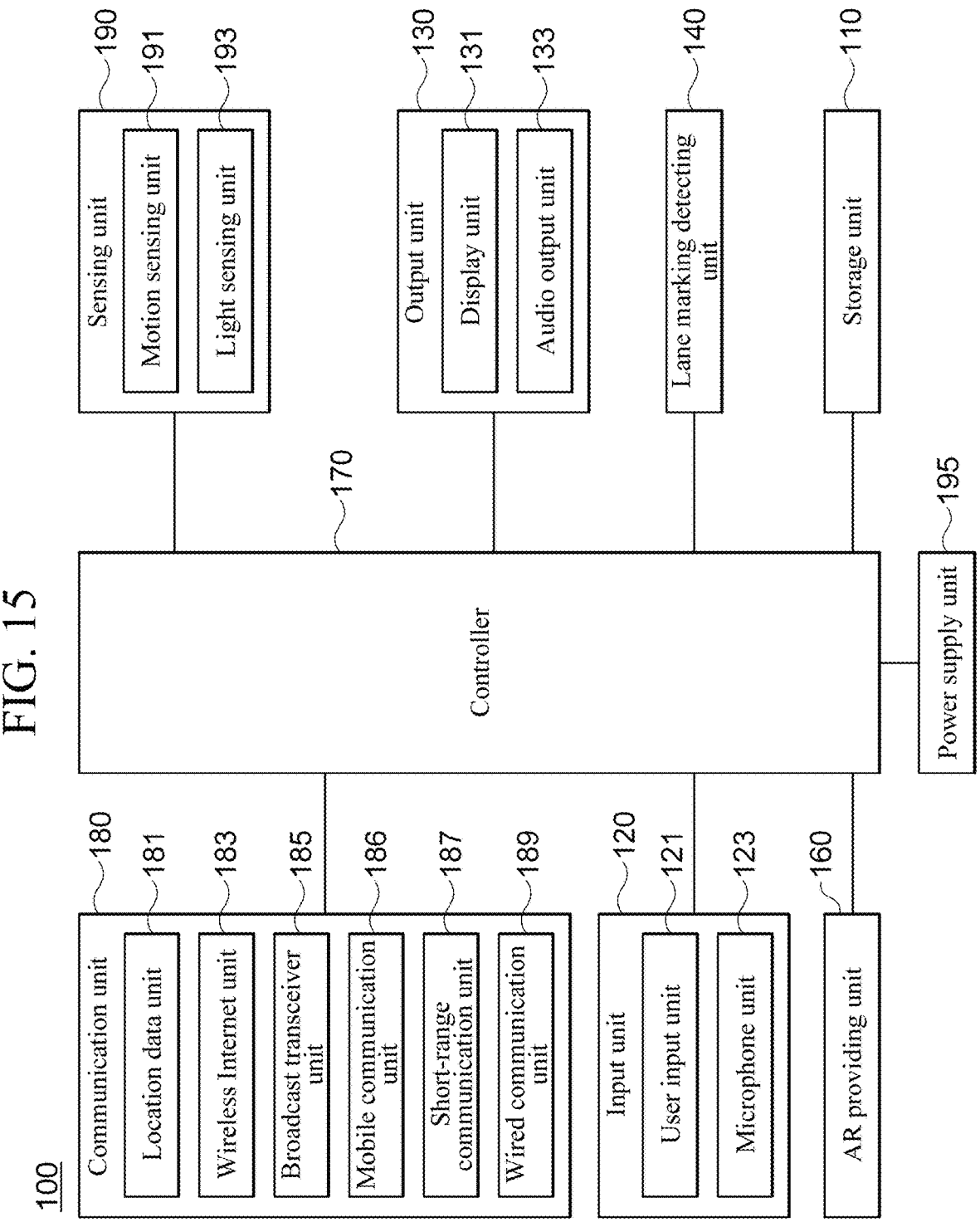
FIG. 15 is a block diagram illustrating an electronic device according to an exemplary embodiment of the present invention.

FIG. 15 is a block diagram illustrating an electronic device according to an exemplary embodiment of the present invention. Referring to FIG. 15, the electronic device 100 includes all or some of a storage unit 110, an input unit 120, an output unit 130, a lane marking detecting unit 140, an augmented reality (AR) providing unit 160, a controller 170, and a communication unit 180, a sensing unit 190, and a power supply unit 195.

Here, the electronic device 100 may be implemented as various devices such as a smartphone, a tablet computer, a notebook computer, a personal digital assistant (PDA), a portable multimedia player (PMP), a smart glass, a project glass, a navigation device, or a car dash cam or a car video recorder, which is an imaging device for a vehicle, and may be provided in a vehicle.

Driving-related guidance may include various guidance for assisting a driver in driving a vehicle such as route guidance, lane departure guidance, lane maintenance guidance, front vehicle departure guidance, traffic light change guidance, front vehicle collision prevention guidance, lane change guidance, lane guidance, curve guidance, etc.

Here, the route guidance may include an AR route guidance for performing route guidance by combining various information such as a user's location and direction to an image obtained by capturing a front of a running vehicle or 2-dimensional (2D) or a 3-dimensional (3D) route guidance for performing route guidance by combining various information such as a user's location and direction to 2D or 3D map data.

In addition, the route guidance may include aerial map route guidance for performing route guidance by combining various information such as a user's location and direction with the aerial map data. Here, the route guidance may be interpreted as a concept including not only a case in which a user rides in a vehicle and drives but also a case in which a user walks or jumps to move.

In addition, the lane departure guidance may guide whether a vehicle which is running has deviated from a lane marking.

In addition, the lane maintenance guidance may guide the vehicle to return to an original driving lane.

In addition, the front vehicle departure guidance may guide whether a vehicle located in front of a vehicle being stopped is departing.

In addition, the traffic light change guidance may guide whether a signal change of a traffic light located in front of the vehicle being stopped. For example, when a red traffic light indicating a stop signal is turned on and is changed to a blue traffic light indicating a start signal, this may be guided.

In addition, the front vehicle collision prevention guidance may guide to prevent a collision with the vehicle in front when a distance between a vehicle stopped or running and a vehicle located in front of the vehicle is within a predetermined distance.

In addition, the lane change guidance may guide a change from a lane in which a vehicle is located to another lane in order to guide a route to a destination.

In addition, the lane guidance may guide the lane in which the vehicle is currently located.

In addition, the curve guidance may guide that a road on which the vehicle will travel after a predetermined time is a curve.

The driving-related images, such as a front image of a vehicle that enables the provision of various guidance, may be captured by a camera mounted on the vehicle or a camera of a smart phone. Here, the camera may be a camera integrally formed with the electronic device 100 mounted on the vehicle to image the front of the vehicle.

As another example, the camera may be a camera mounted on a vehicle separately from the electronic device 100 to image the front of the vehicle. In this case, the camera may be a separate imaging device for a vehicle mounted toward the front of the vehicle and the electronic device 100 may receive a captured image through wired/wireless communication from the separately mounted imaging device for a vehicle, or when a storage medium storing the captured image of the imaging device for a vehicle is inserted into the electronic device 100, the electronic device 100 may receive the captured image.

Hereinafter, the electronic device 100 according to an exemplary embodiment of the present invention will be described in more detail based on the aforementioned contents.

The storage unit 110 functions to store various data and applications required for an operation of the electronic device 100. In particular, the storage unit 110 may store data necessary for an operation of the electronic device 100, e.g., an OS, a route search application, and map data. In addition, the storage unit 110 may store data generated by an operation of the electronic device 100, for example, searched route data and a received image.

The storage unit 110 may be implemented as an internal storage element such as a random access memory (RAM), a flash memory, read only memory (ROM), an erasable programmable ROM (EPROM), an electronically erasable and programmable ROM (EEPROM), a register, a hard disk, a removable disk, a memory card, a universal subscriber identity module (USIM), and a detachable storage element such as a USB memory or the like.

The input unit 120 functions to convert a physical input from the outside of the electronic device 100 into a specific electric signal. Here, the input unit 120 may include all or some of the user input unit 121 and the microphone unit 123.

The user input unit 121 may receive a user input such as a touch or a push operation. Here, the user input unit 121 may be implemented using at least one of various button types, a touch sensor receiving a touch input, and a proximity sensor receiving an approaching motion.

The microphone unit 123 may receive a user's voice and a sound generated inside and outside the vehicle.

The output unit 130 is a device that outputs data of the electronic device 100 to a user as an image and/or audio. Here, the output unit 130 may include all or some of the display unit 131 and the audio output unit 133.

The display unit 131 is a device outputting data that may be visually recognized by a user. The display unit 131 may be implemented as a display unit provided on the front of a housing of the electronic device 100. In addition, the display unit 131 may be integrally formed with the electronic device 100 to output visual recognition data and may be installed separately from the system 100 such as a head-up display (HUD) to output visual recognition data.

The audio output unit 133 is a device outputting data that may be audibly recognized by the electronic device 100. The audio output unit 133 may be implemented as a speaker expressing, as sound, data to be notified by the user of the electronic device 100.

The lane marking detecting unit 140 may perform the function of the lane marking detecting apparatus 10 described above.

The AR providing unit 160 may provide an AR view mode. Here, AR may be a method of providing additional information (e.g., a graphic element representing a point of interest (POI), a graphic element guiding a risk of a front vehicle collision, a graphic element indicating a distance between vehicles, a graphic element guiding a curve, and various additional information assisting safety driving of a driver) visually in an overlapping manner on a screen that contains real world actually viewed by the user.

The AR providing unit 160 may include all or some of a calibration unit, a 3D space generating unit, an object generating unit, and a mapping unit.

The calibration unit may perform calibration to estimate a camera parameter corresponding to the camera from a captured image captured by the camera. Here, the camera parameter is a parameter constituting a camera matrix, which is information indicating a relationship between a real space and a photograph, and may include extrinsic parameters of the camera and intrinsic parameters of the camera.

The 3D space generating unit may generate a virtual 3D space based on a captured image captured by the camera. Specifically, the 3D space generating unit may generate a virtual 3D space by applying the camera parameter estimated by the calibration unit to a 2D captured image.

The object generating unit may generate an object for guidance on AR, for example, a front vehicle collision prevention guidance object, a route guidance object, a lane change guidance object, a lane departure guidance object, a curve guidance object, and the like. In this case, the object generating unit may generate a plurality of objects for guidance on the AR based on the lane marking detected by the lane marking detecting unit 140 based on the lane marking.

Specifically, the object generating unit may generate a route guidance object for guiding a route to a destination based on the lane marking detected by the lane marking detecting unit 140. This will be described in more detail with reference to FIG. 16.

Figure 16:
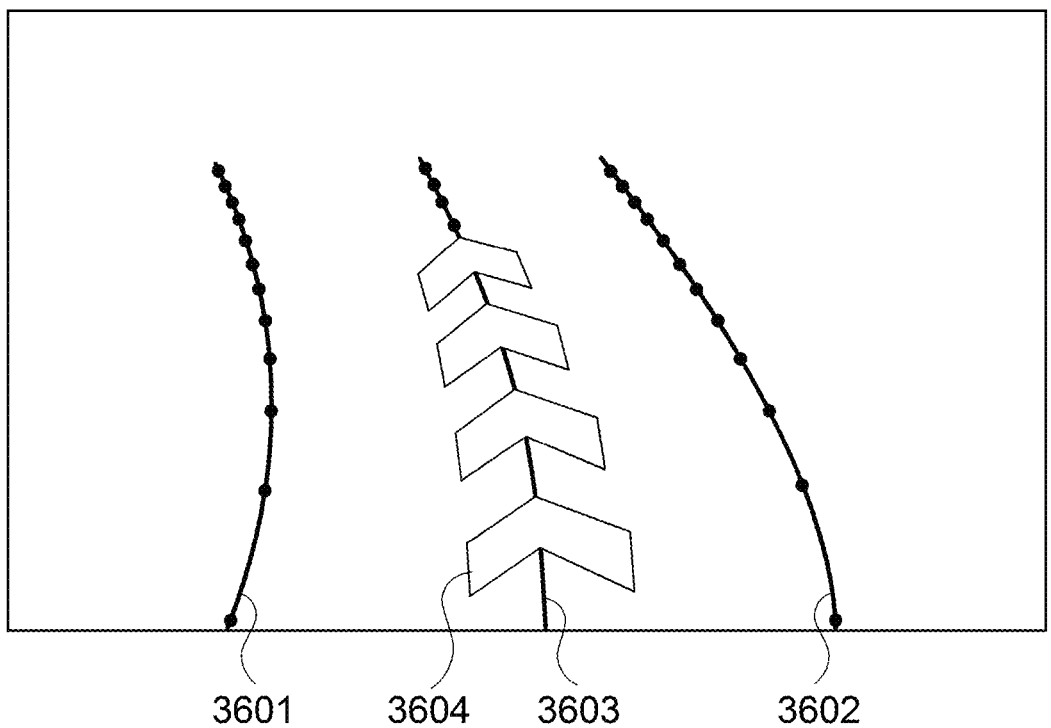
FIG. 16 is a view illustrating a method of generating a route guidance object according to an exemplary embodiment of the present invention.

FIG. 16 is a view illustrating a method of generating a route guidance object according to an exemplary embodiment of the present invention. Referring to FIG. 16, the object generating unit may detect a plurality of points constituting a left lane marking 3601 detected by the lane marking detecting unit 140. Also, the object generating unit may detect a plurality of points constituting a right lane marking 3602 detected by the lane marking detecting unit 140. Here, the plurality of detected points may be lane marking points matched to the front view image by calculating a curve equation formed by the lane marking points detected from the top view image by the lane marking point detecting unit 16, approximating the detected lane marking points as a curve based on the calculated curve equation, and transforming the approximated lane marking points to a view of the front view image.

In addition, the object generating unit may determine virtual points located in the middle of the points of the left lane 3601 and the points of the right lane 3602, and generate a virtual guide line 3603 by connecting the virtual points. In this case, the object generating unit may generate the virtual guide line 3603 by calculating a curve equation formed by the virtual points and approximating the detected lane marking points as a curve based on the calculated curve equation.

In addition, the object generating unit may generate a route guidance object 3604 having a center on the virtual guide line 3603. For example, the generated route guidance object 3604 has an arrow shape, and the arrow may indicate a route on which the vehicle should travel.

However, this is only an exemplary embodiment of the present invention, and the route guidance object of the present invention is not limited thereto. According to another exemplary embodiment of the present invention, the object generating unit may generate a route guidance object disposed on a lane in which the vehicle should travel in the left lane marking and the right lane marking using only the plurality of points constituting the detected left lane marking 3601 and the plurality of points constituting the detected right lane marking 3602 without calculating the virtual guidance line 3603.

In addition, the object generating unit may generate a lane departure guidance object based on the lane making detected by the lane marking detecting unit 140. Specifically, when the running vehicle leaves a lane marking, the object generating unit may generate a lane departure guidance object disposed in the lane marking from which the vehicle has left, using the lane marking detected by the lane marking detecting unit 140. That is, the lane departure guidance object generated by the object generating unit may be generated in the same shape as the lane marking detected by the lane marking detecting unit 140 (that is, a lane marking approximated (fitting) to a curve by the lane marking detecting unit 140).

Meanwhile, the communication unit 180 may be provided for the electronic device 100 to communicate with other devices. The communication unit 180 may include all or some of a location data unit 181, a wireless Internet unit 183, a broadcast transceiver unit 185, a mobile communication unit 186, a short-range communication unit 187, and a wired communication unit 189.

The location data unit 181 refers to a device that acquires location data through a global navigation satellite system (GNSS). GNSS refers to a navigation system capable of calculating a location of a receiving terminal using radio signals received from satellites. Specific examples of GNSS include global positioning system (GPS), Galileo, global orbiting navigational satellite system (GLONASS), COMPASS, Indian regional navigational satellite system (IRNSS), quasi-zenith satellite system (QZSS), etc. according to operators. The location data unit 181 of the system according to an exemplary embodiment of the present invention may acquire location data upon receiving a GNSS signal provided in a region in which the electronic device 100 is used. Alternatively, the location data unit 181 may acquire location data through communication with a base station or an access point (AP) in addition to the GNSS.

The wireless Internet unit 183 is a device that acquires or transmits data by accessing the wireless Internet. The wireless internet unit 183 may access the Internet through various communication protocols defined to perform wireless data transmission and reception of wireless LAN (WLAN), wireless broadband (Wibro), world interoperability for microwave access (Wimax), and high speed downlink packet access (HSDPA).

The broadcast transceiver unit 185 is a device that transmits and receives broadcast signals through various broadcast systems. Broadcast systems that may transmit and receive through the broadcast transceiver unit 185 include digital multimedia broadcasting terrestrial (DMBT), digital multimedia broadcasting satellite (DMBS), media forward link only (MediaFLO), digital video broadcast handheld (DVBH), and integrated services digital broadcast terrestrial (ISDBT). Broadcast signals transmitted and received through the broadcast transceiver unit 185 may include traffic data, life data, and the like.

The mobile communication unit 186 may perform voice and data communication by accessing a mobile communication network according to various mobile communication standards such as 3rd generation (3G), 3rd generation partnership project (3GPP), and long term evolution (LTE).

The short-range communication unit 187 is a device for short-range communication. As described above, the short-range communication unit 187 performs communication through Bluetooth, radio frequency identification (RFID), infrared data association (IrDA), ultra wideband (UWB), ZigBee, near field communication (NFC), wireless-fidelity (Wi-Fi), etc.

The wired communication unit 189 is an interface device capable of connecting the electronic device 100 to another device by wire. The wired communication unit 189 may be a USB module capable of communicating through a USB port.

The communication unit 180 may communicate with another device using at least one of the location data unit 181, the wireless Internet unit 183, a broadcast transceiver unit 185, the mobile communication unit 186, the short-range communication unit 187, and the wired communication unit 189.

As an example, when the electronic device 100 does not include a camera function, an image captured by a imaging device fora vehicle such as a car dash cam or a car video recorder may be received using at least one of the short-range communication unit 187 and the wired communication unit 189.

As another example, in the case of communicating with a plurality of devices, one thereof may communicate with the short-range communication unit 187 and the other may communicate with the wired communication unit 119.

The sensing unit 190 is a device capable of detecting a current state of the electronic device 100. The sensing unit 190 may include all or some of a motion sensing unit 191 and a light sensing unit 193.

The motion sensing unit 191 may detect a motion of the electronic device 100 in a 3D space. The motion sensing unit 191 may include a 3-axis geomagnetic sensor and a 3-axis acceleration sensor. A trace of the vehicle to which the electronic device 100 is attached may be more accurately calculated by combining motion data acquired through the motion sensing unit 191 with position data acquired through the location data unit 181.

The light sensing unit 193 is a device that measures ambient illuminance of the system 100. Brightness of the display unit 131 may be changed to correspond to ambient brightness using illuminance data acquired through the light sensing unit 193.

The power supply unit 195 is a device that supplies power necessary for an operation of the electronic device 100 or an operation of another device connected to the electronic device 100. The power supply unit 195 may be a device that receives power from a battery built in the electronic device 100 or an external power source of a vehicle. In addition, the power supply unit 195 may be implemented as a wired communication module 119 or may be implemented as a device supplied wirelessly according to a type of receiving power.

The controller 170 controls an overall operation of the electronic device 100. Specifically, the controller 170 may control all or some of the storage unit 110, the input unit 120, the output unit 130, the lane marking detecting unit 140, the AR providing unit 160, the communication unit 180, the sensing unit 190, and the power supply unit 195.

Figure 17:
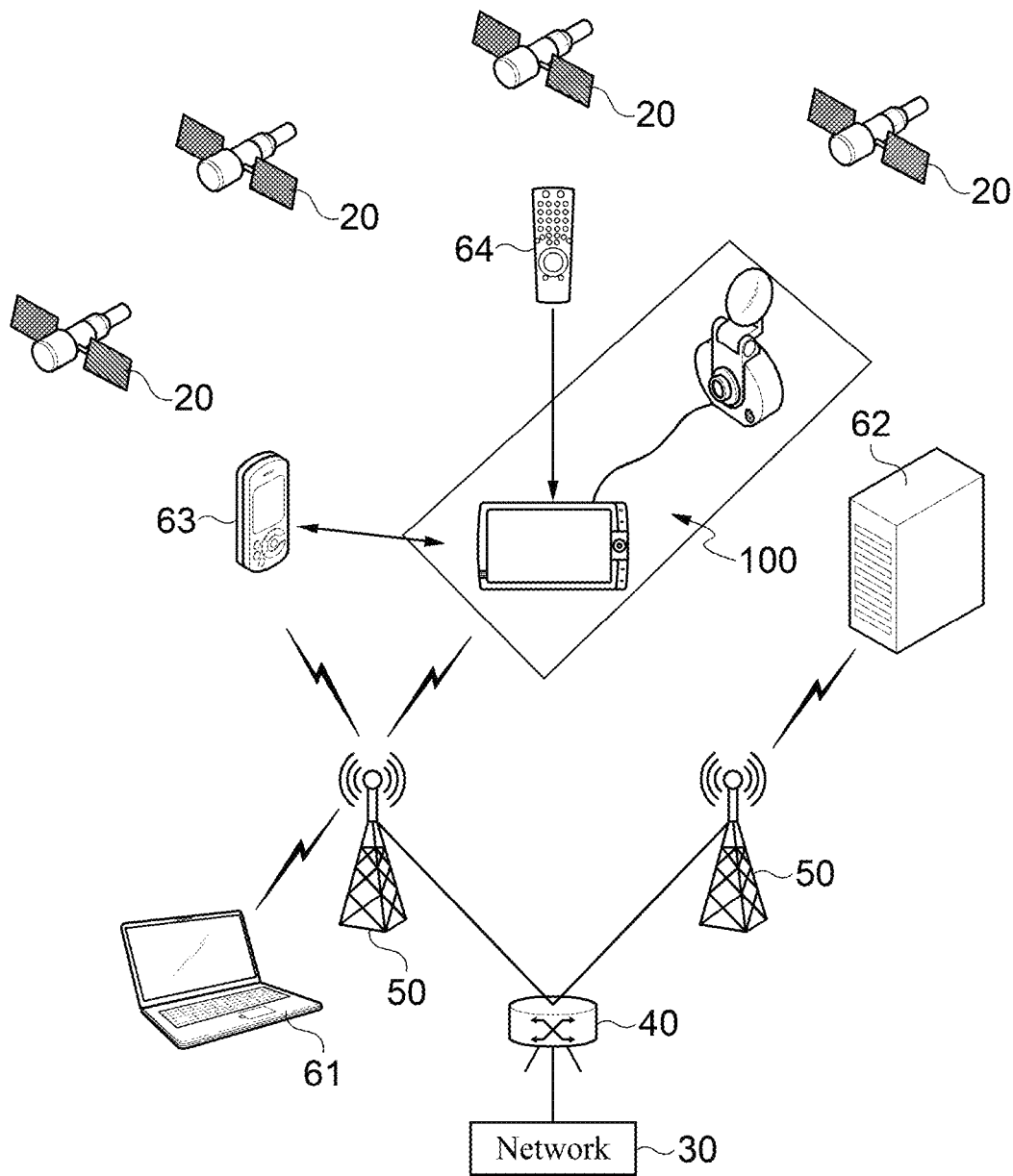
FIG. 17 is a view illustrating a system network connected to an electronic device according to an exemplary embodiment of the present invention.

FIG. 17 is a view illustrating a system network connected to an electronic device according to an exemplary embodiment of the present invention. Referring to FIG. 17, an electronic device 100 according to an exemplary embodiment of the present invention may be implemented as various devices provided in a vehicle such as a navigation device, an imaging device for a vehicle, a smartphone, or other device for providing an AR interface for a vehicle, and may be connected to various communication networks and other electronic devices 61 to 64.

In addition, the electronic device 100 may calculate a current location and a current time zone by interworking with a GPS module according to a radio signal received from a satellite 70.

Each satellite 70 may transmit an L-band frequency having a different frequency band. The system 100 may calculate a current location based on a time taken for the L-band frequency transmitted from each satellite 70 to reach the electronic device 100.

Meanwhile, the electronic device 100 may wirelessly access a network 90 through a control station (ACR) 80, a base station (RAS) 85, an access point (AP), etc. via the communication unit 180. When the electronic device 100 is connected to the network 90, the electronic device 100 may be indirectly connected with other electronic devices 61 and 62 connected to the network 90, to exchange data.

Meanwhile, the electronic device 100 may indirectly access the network 90 through another device 63 having a communication function. For example, when a module capable of accessing the network 90 is not provided in the electronic device 100, the electronic device 100 may communicate with another device 63 having a communication function through a short-range communication module or the like.

Figure 18:
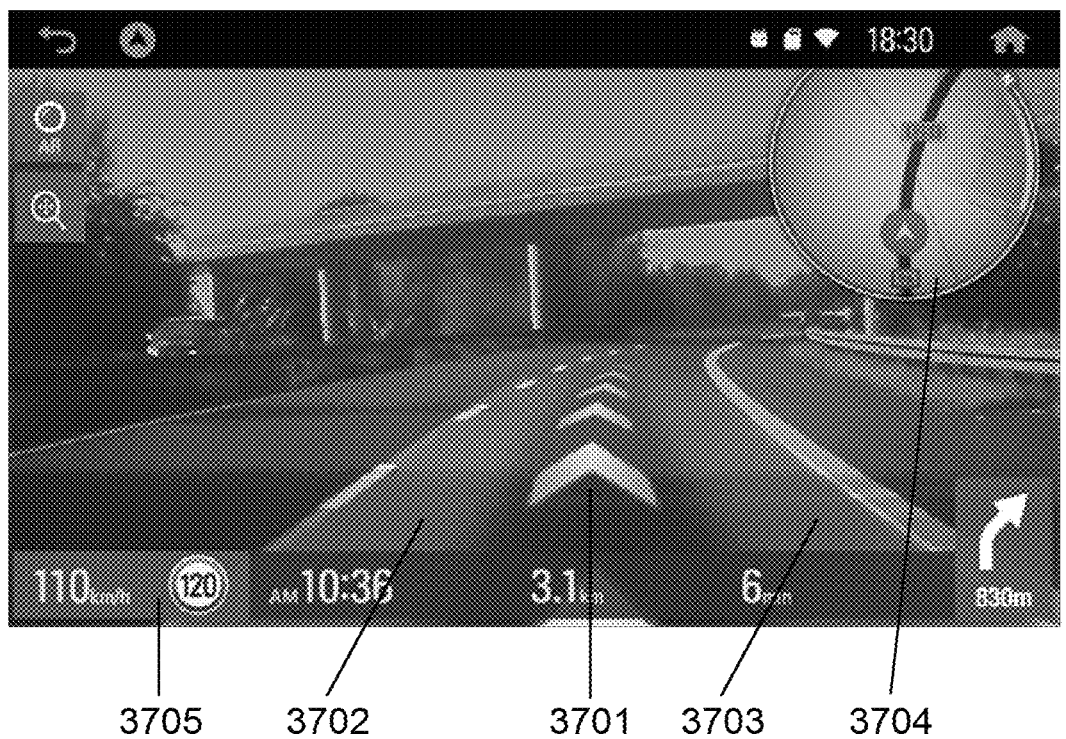
FIG. 18 is a view illustrating an augmented reality (AR) guide screen displaying a route guidance object according to an exemplary embodiment of the present invention.

FIG. 18 is a view illustrating an AR guide screen displaying a route guidance object according to an exemplary embodiment of the present invention. Referring to FIG. 18, the AR providing unit 160 may generate route guidance objects 3701, 3702, and 3703 guiding a route from a current location of a vehicle to a destination, generating an AR image displaying the generated route guidance objects 3701, 3702, and 3703 on a lane of a driving image captured based on a lane marking detected by the lane marking detecting unit 140, and displaying the generated AR image on a screen.

That is, the display unit 131 may display, on the AR image, a first route guidance object 3701 having an arrow shape indicating a route in which the vehicle should travel and having the center at a virtual guide line located at the center of both lane markings detected by the lane marking detecting unit 140. Here, the virtual guide line may be a virtual guide line formed by connecting virtual points located in the middle of points of a left lane marking and points of a right lane marking.

In addition, the display unit 131 may display a second route guidance object 3702 and a third route guidance object 3703 on the left and right sides of the first route guidance object 3701, respectively, and the second route guidance object 3702 and the third route guidance object 3703 may be displayed on driving lanes of a vehicle that does not depart from the left and right lane markings detected by the lane marking detecting unit 140. Here, the second route guidance object 3702 and the third route guidance object 3703 may be carpet-shaped lane identification objects displayed only in the driving lane of the vehicle.

In addition, the AR image according to an exemplary embodiment of the present invention may include a region 3704 for displaying a location of a vehicle on a map. In addition, the AR image according to an exemplary embodiment of the present invention may further include a region 3705 displaying driving information of the vehicle, e.g., a driving speed of the vehicle, a speed limit of a road on which the vehicle is running, a current time, a distance to a destination, a remaining time, a direction in which the vehicle should travel at a turning point, and a distance to the turning point.

Figure 19:
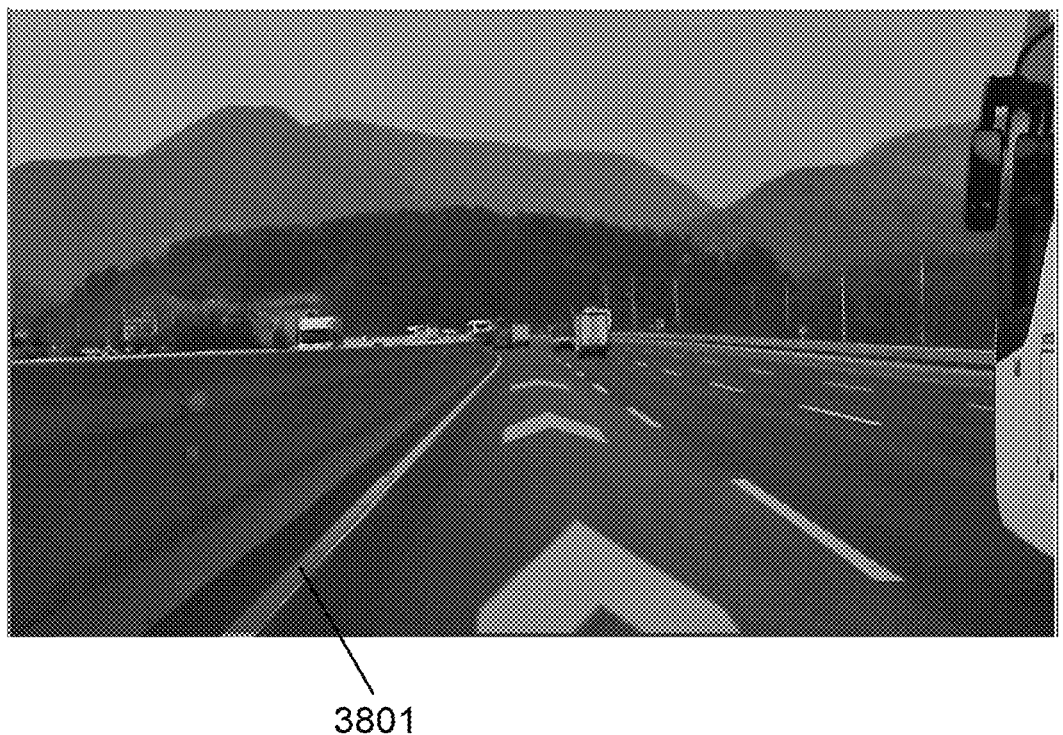
FIG. 19 is a view illustrating an AR guide screen displaying a lane departure guidance object according to an exemplary embodiment of the present invention.

FIG. 19 is a view illustrating an AR guidance screen displaying a lane departure guidance object according to an exemplary embodiment of the present invention. Referring to FIG. 19, the AR providing unit 160 may generate a lane departure guidance object 3801 that guides lane departure of the vehicle and generate an AR image displaying a generated lane departure guidance object 3801 based on a lane marking detected by the lane marking detecting unit 140.

For example, as shown in FIG. 19, when the vehicle deviates from the left lane marking, the display unit 131 may generate a left lane departure guidance object 3801 having the same shape (curve-approximated (fitted) by the lane marking detecting unit 140) and display an AR image to display the generated left land departure guidance object 3801 on the lane marking detected by the lane marking detecting unit 140.

Figure 20:
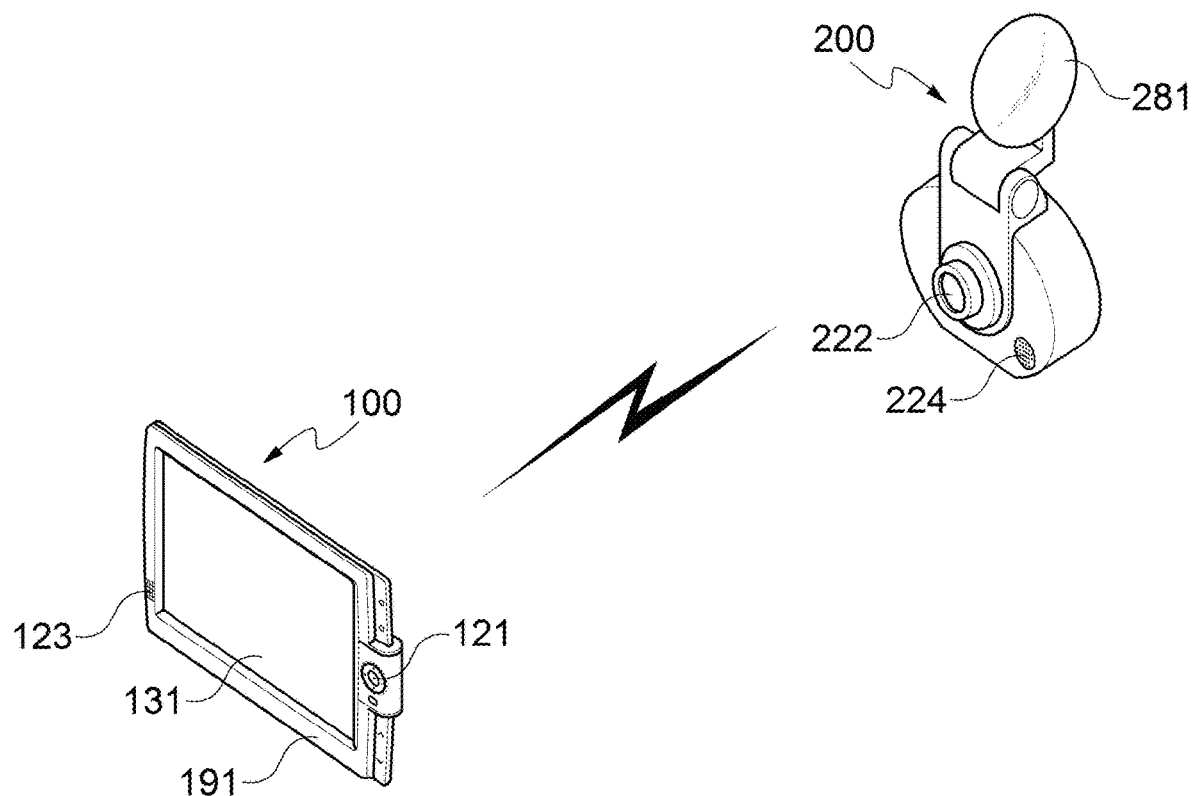
FIG. 20 is a view illustrating an implementation form in a case in which an electronic device according to an exemplary embodiment of the present invention does not include an imaging unit.

FIG. 20 is a view illustrating an implementation form when an electronic device according to an exemplary embodiment of the present invention does not include an imaging unit. Referring to FIG. 20, an imaging device 200 for a vehicle provided separately from the electronic device 100 may configure a system according to an exemplary embodiment of the present invention using a wired/wireless communication method.

The electronic device 100 may include a display unit 131 provided on a front surface of a housing 191, a user input unit 121, and a microphone 123.

The imaging device 200 for a vehicle may include a camera 222, a microphone 224, and an attaching part 281.

Figure 21:
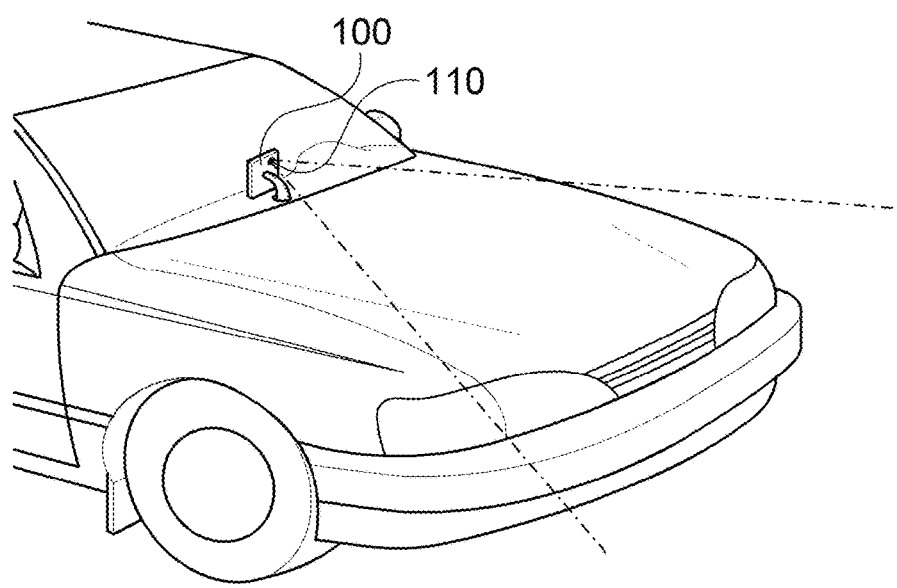
FIG. 21 is a view illustrating an implementation form in a case in which an electronic device according to an exemplary embodiment of the present invention includes an imaging unit.

FIG. 21 is a view illustrating an implementation form when an electronic device according to an exemplary embodiment of the present invention includes an imaging unit. Referring to FIG. 21, when the electronic device 100 includes an imaging unit 150, the imaging unit 150 may image a front of a vehicle and allow the user to recognize a display part of the electronic device 100. Accordingly, a system according to an exemplary embodiment of the present invention may be implemented.

Figure 22:
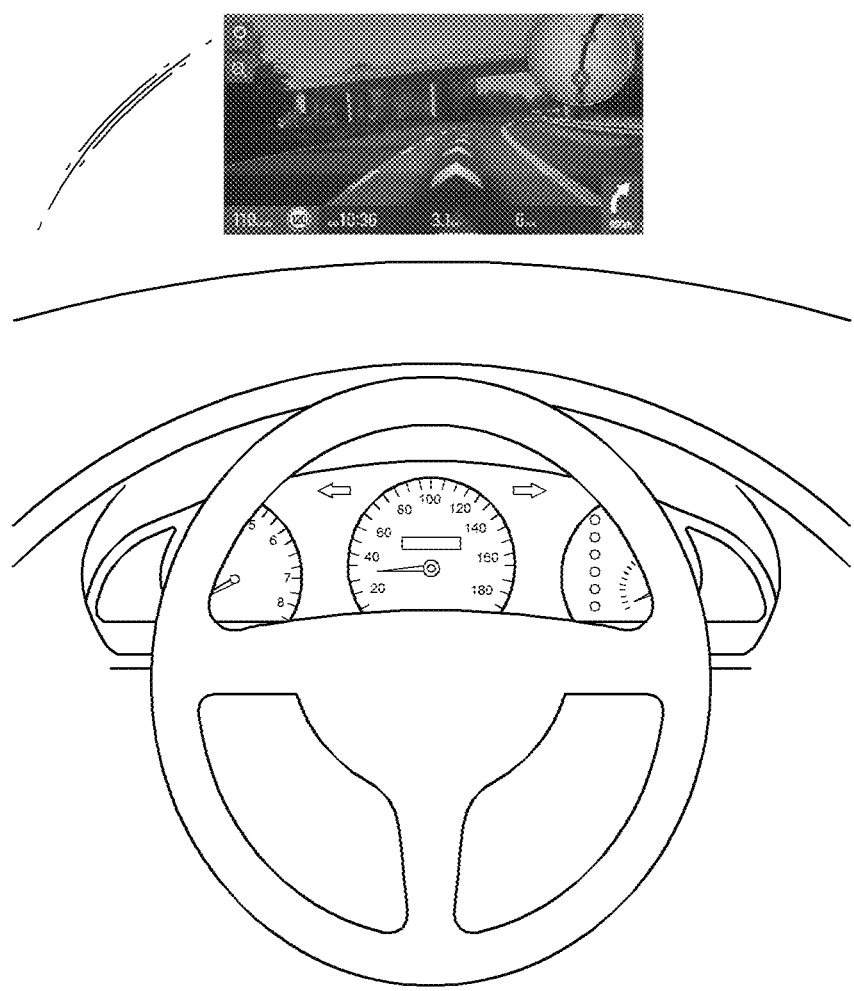
FIG. 22 is a view illustrating an implementation form using a head-up display (HUD) according to an exemplary embodiment of the present invention.

FIG. 22 is a diagram illustrating an implementation form using a head-up display (HUD) according to an exemplary embodiment of the present invention. Referring to FIG. 22, the HUD may display an AR guidance screen on a head-up display through wired/wireless communication with other devices.

For example, the AR may be provided through a HUD using a vehicle windshield or image overlay using a separate image output device, and the AR providing unit 160 may generate an interface image overlaid on a real image or glass. Through this, an AR navigation or vehicle infotainment system may be implemented.

Meanwhile, the lane marking detecting apparatus 10 may be implemented as a module of a system for autonomous driving to perform a route guidance function. This will be described in more detail with reference to FIGS. 23 and 24.

Figure 23:
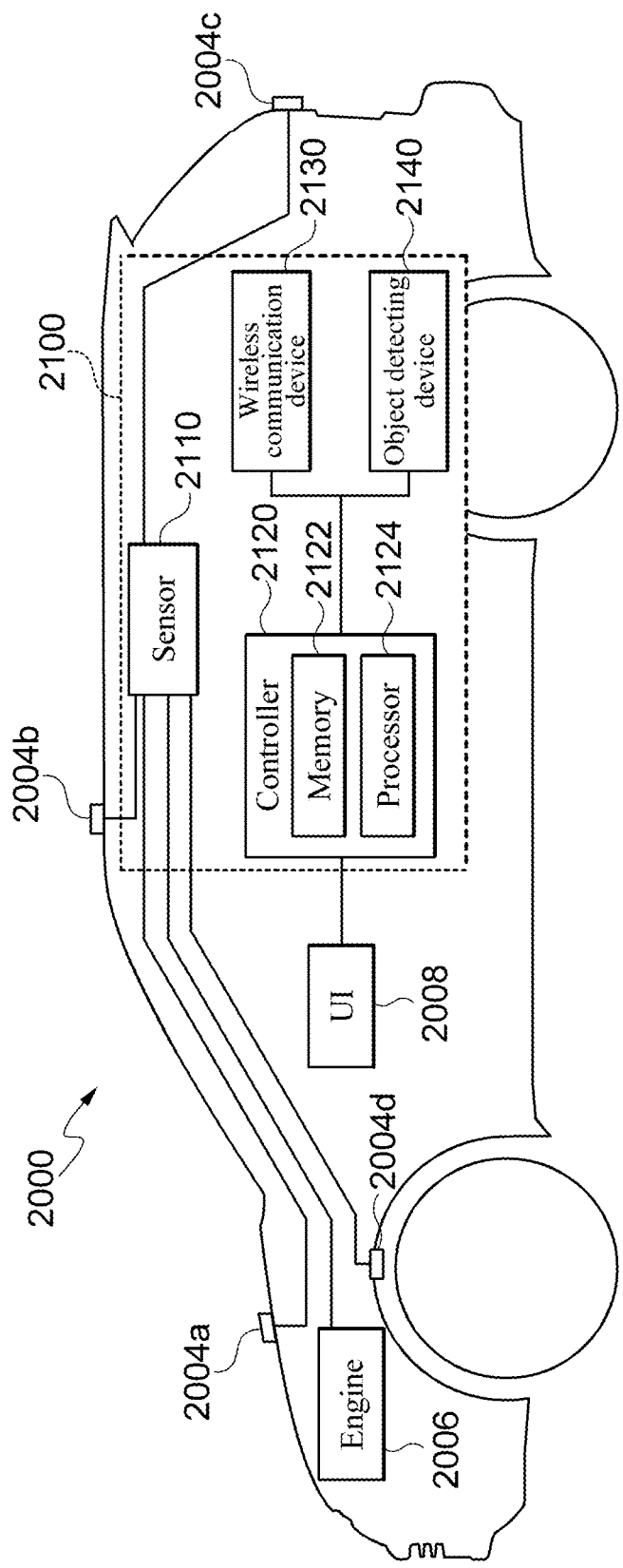
FIG. 23 is a block diagram illustrating an autonomous driving system according to an exemplary embodiment of the present invention.

Referring to FIG. 23, an autonomous vehicle 2000 according to the present exemplary embodiment includes a control device 2100, sensing modules 2004a, 2004b, 2004c, and 2004d, an engine 2006, and a user interface 2008.

The autonomous vehicle 2000 may have an autonomous driving mode or a manual mode. For example, the autonomous vehicle 2000 may be switched from the manual mode to the autonomous driving mode or from the autonomous driving mode to the manual mode according to a user input received through the user interface 2008.

When the vehicle 2000 is operated in the autonomous driving mode, the autonomous vehicle 2000 may be operated under the control of the control device 2100.

In this exemplary embodiment, the control device 2100 may include a controller 2120 including a memory 2122 and a processor 2124, a sensor 2110, a communication device 2130, and an object detecting device 2140.

In this exemplary embodiment, the object detecting device 2140 is a device for detecting an object located outside the vehicle 2000, and the object detecting device 2140 may detect an object located outside the vehicle 2000 and generate object information according to a detection result.

The object information may include information on the presence or absence of an object, location information of the object, distance information between the vehicle and the object, and relative speed information between the vehicle and the object.

The object may include various objects located outside the vehicle 2000 such as lane markings, other vehicles, pedestrians, traffic signals, light, roads, structures, speed bumps, terrain objects, animals, and the like. Here, the traffic signal may be a concept including a traffic light, a traffic sign, or a pattern or text drawn on a road surface. In addition, light may be light generated from a lamp provided in another vehicle, light generated from a street lamp, or sunlight.

The structure may be an object located around a road and fixed to the ground. For example, the structure may include street lights, street trees, buildings, power poles, traffic lights, and bridges. The terrain objects may include mountains, hills, and the like.

The object detecting device 2140 may include a camera module. The controller 2120 may extract object information from an external image captured by the camera module and cause the controller 2120 to process the information.

In addition, the object detecting device 2140 may further include imaging devices for recognizing an external environment. In addition to LIDAR, RADAR, GPS device, odometry, and other computer vision devices, ultrasonic sensors, and infrared sensors may be used, and these devices may be selectively or simultaneously operated as necessary to enable more precise detection.

In addition, the sensor 2110 may be connected to the sensing modules 2004a, 2004b, 2004c, and 2004d to acquire various kinds of sensing information on a vehicle internal/external environment. Here, the sensor 2110 may include a posture sensor (e.g., a yaw sensor, a roll sensor, or a pitch sensor), a collision sensor, a wheel sensor, a speed sensor, an inclination sensor, a weight detection sensor, a heading sensor, a gyro sensor, a position module, a vehicle forward/reverse sensor, a battery sensor, a fuel sensor, a tire sensor, a steering sensor based on handle rotation, a vehicle internal temperature sensor, a vehicle internal humidity sensor, an ultrasonic sensor, an illuminance sensor, an accelerator pedal position sensor, a brake pedal position sensor, and the like.

Accordingly, the sensor 2110 may acquire vehicle posture information, vehicle collision information, vehicle direction information, vehicle position information (GPS information), vehicle angle information, vehicle speed information, vehicle acceleration information, vehicle inclination information, vehicle advance/reverse information, battery information, fuel information, tire information, vehicle lamp information, vehicle internal temperature information, vehicle internal humidity information, steering wheel rotation angle, vehicle external illumination, and a sensing signal for pressure applied to an accelerator pedal, pressure applied to a brake pedal, etc.

In addition, the sensor 2110 may further include an accelerator pedal sensor, a pressure sensor, an engine speed sensor, air flow sensor (AFS), an intake air temperature sensor (ATS), water temperature sensor (WTS), a throttle position sensor (TPS), a TDC sensor, a crank angle sensor (CAS), and the like.

In this manner, the sensor 2110 may generate vehicle state information based on sensing data.

The wireless communication device 2130 is configured to implement wireless communication between the autonomous vehicles 2000. For example, the autonomous vehicle 2000 may communicate with a user's mobile phone, another wireless communication device 2130, another vehicle, a central device (a traffic control device), a server, and the like. The wireless communication device 2130 may transmit and receive wireless signals according to wireless communication protocols. The wireless communication protocols may be Wi-Fi, Bluetooth, long-term evolution (LTE), code division multiple access (CDMA), wideband code division multiple access (WCDMA), global systems for mobile communications (GSM), but are not limited thereto.

In addition, in the present exemplary embodiment, the autonomous vehicle 2000 may implement vehicle-to-vehicle communication through the wireless communication device 2130. That is, the wireless communication device 2130 may communicate with another vehicle and other vehicles on the road through vehicle-to-vehicle communication (V2V). The autonomous vehicle 2000 may transmit and receive information such as driving warning and traffic information through V2V communication and may request information or receive a request from another vehicle. For example, the wireless communication device 2130 may perform V2V communication with a dedicated short-range communication (DSRC) device or a cellular-V2V (C-V2V) device. In addition, in addition to V2V communication, communication between the vehicle and other objects (vehicle to everything communication (V2X)) (e.g., electronic devices carried by pedestrians) may be implemented through the wireless communication device 2130.

In this exemplary embodiment, the controller 2120 is a unit that controls an overall operation of each unit in the vehicle 2000 and may be configured at the time of manufacturing by a manufacturer of the vehicle or additionally configured to perform a function of autonomous driving after manufacturing. Alternatively, a component for continuously performing an additional function may be included through upgrading of the controller 2120 configured at the time of manufacturing. The controller 2120 may also be referred to as an electronic controller (ECU).

The controller 2120 may collect various data from the connected sensor 2110, the object detecting device 2140, the communication device 2130, etc. and transfer a control signal to other components in the vehicle such as the sensor 2110, the engine 2006, the user interface 2008, the communication device 2130, and the object detecting device 2140, based on the collected data. In addition, although not shown, the control signal may also be transmitted to an acceleration device, a braking system, a steering device, or a navigation device related to driving of the vehicle.

In this exemplary embodiment, the controller 2120 may control the engine 2006. For example, the controller 2120 may detect a speed limit of a road on which the autonomous vehicle 2000 is running and control the engine 2006 so that a driving speed of the vehicle does not exceed the speed limit or control the engine 2006 to accelerate a driving speed of the autonomous vehicle 2000 within a range not exceeding the speed limit.

In addition, if the autonomous vehicle 2000 approaches or leaves a lane marking during driving, the controller 2120 may determine whether such lane marking proximity and or departure is according to a normal driving situation or whether it is according to other driving conditions, and control the engine 2006 to control driving of the vehicle according to a determination result. Specifically, the autonomous vehicle 2000 may be equipped with a lane marking detecting apparatus 10 according to an exemplary embodiment of the present invention, and the lane marking detecting apparatus 10 may detect lane markings formed on both sides of a lane in which the vehicle is running. In this case, the controller 2120 may determine whether the autonomous vehicle 2000 is approaching or leaving the lane marking, and if it is determined that the autonomous vehicle 2000 is approaching or leaving the lane marking, the controller 2120 may determine whether such driving is based on an accurate driving situation or other driving situations. Here, an example of a normal driving situation may be a situation in which the vehicle needs to change lanes. In addition, an example of other driving situations may be a situation in which the vehicle does not need to change lanes. If it is determined that the autonomous vehicle 2000 is approaching or leaving the lane marking in a situation in which the vehicle does not need to change lanes, the controller 2120 may control the autonomous vehicle 2000 to normally run without departing the lane marking.

The lane marking detecting apparatus 10 may be configured as a module in the control device 2100 of the autonomous vehicle 2000. That is, the memory 2122 and the processor 2124 of the control device 2100 may implement the lane detecting method according to the present invention in software.

When another vehicle or an obstacle is present in front of the vehicle, the controller 2120 may control the engine 2006 or a braking system to decelerate the driving vehicle, and may control a trace, a driving route, and a steering angle, in addition to the speed. Alternatively, the controller 2120 may control the driving of the vehicle by generating a necessary control signal according to recognition information of other external environments such as a lane of the driving vehicle and a driving signal.

In addition to generating a control signal of its own, the controller 2120 may perform communication with a nearby vehicle or a central server and transmit a command to control peripheral devices through received information, thereby controlling the driving of the vehicle.

In addition, it may be difficult to accurately recognize a vehicle or a lane marking if a position of the camera module is changed or an angle of view is changed. In order to prevent this, the controller 2120 may generate a control signal to perform calibration of the camera module. Accordingly, in this exemplary embodiment, since the controller 2120 generates a calibration control signal to the camera module, even if a mounting position of the camera module is changed due to vibration or impact that occurs due to movement of the autonomous vehicle 2000, a normal mounting position, direction, and angle of view of the camera module may be continuously maintained. If an initial mounting position, direction, and angle of view information of the camera module stored in advance and an initial mounting position, direction, and angle of view information of the camera module measured during the driving of the autonomous vehicle 2000 are changed by a threshold value or more, the controller 2120 may generate a control signal to calibrate the camera module.

In this exemplary embodiment, the controller 2120 may include the memory 2122 and the processor 2124. The processor 2124 may execute software stored in the memory 2122 according to a control signal from the controller 2120. Specifically, the controller 2120 may store data and instructions for performing the lane marking detecting method according to the present invention in the memory 2122, and the instructions may be executed by the processor 2124 to implement one or more methods disclosed herein.

In this case, the memory 2122 may be stored in a recording medium executable by the nonvolatile processor 2124. The memory 2122 may store software and data through an appropriate internal or external device. The memory 2122 may be configured as a memory device connected to a random access memory (RAM), a read only memory (ROM), a hard disk, and a dongle.

The memory 2122 may store at least an operating system (OS), a user application, and executable instructions. The memory 2122 may also store application data and array data structures.

The processor 2124, as a microprocessor or a suitable electronic processor, may be a controller, a microcontroller, or a state machine.

The processor 2124 may be implemented as a combination of computing devices, and the computing device may be configured as a digital signal processor, a microprocessor, or a suitable combination thereof.

Meanwhile, the autonomous vehicle 2000 may further include the user interface 2008 for user inputting for the control device 2100 described above. The user interface 2008 may allow a user to input information through appropriate interaction. For example, the user interface 2008 may be implemented as a touch screen, a keypad, and an operation button. The user interface 2008 may transmit an input or command to the controller 2120, and the controller 2120 may perform a vehicle control operation in response to the input or command.

In addition, the user interface 2008 may allow a device outside the autonomous vehicle 2000 to communicate with the autonomous vehicle 2000 through the wireless communication device 2130. For example, the user interface 2008 may interwork with a mobile phone, a tablet, or other computer devices.

Furthermore, in the present exemplary embodiment, the autonomous vehicle 2000 has been described as including the engine 2006, but the autonomous vehicle 200 may include other types of propulsion systems. For example, a vehicle may be driven by electric energy and may be driven by hydrogen energy or a hybrid system combining them. Accordingly, the controller 2120 may include a propulsion mechanism according to a propulsion system of the autonomous vehicle 2000 and provide a control signal according to the propulsion system to components of each propulsion mechanism.

Figure 24:
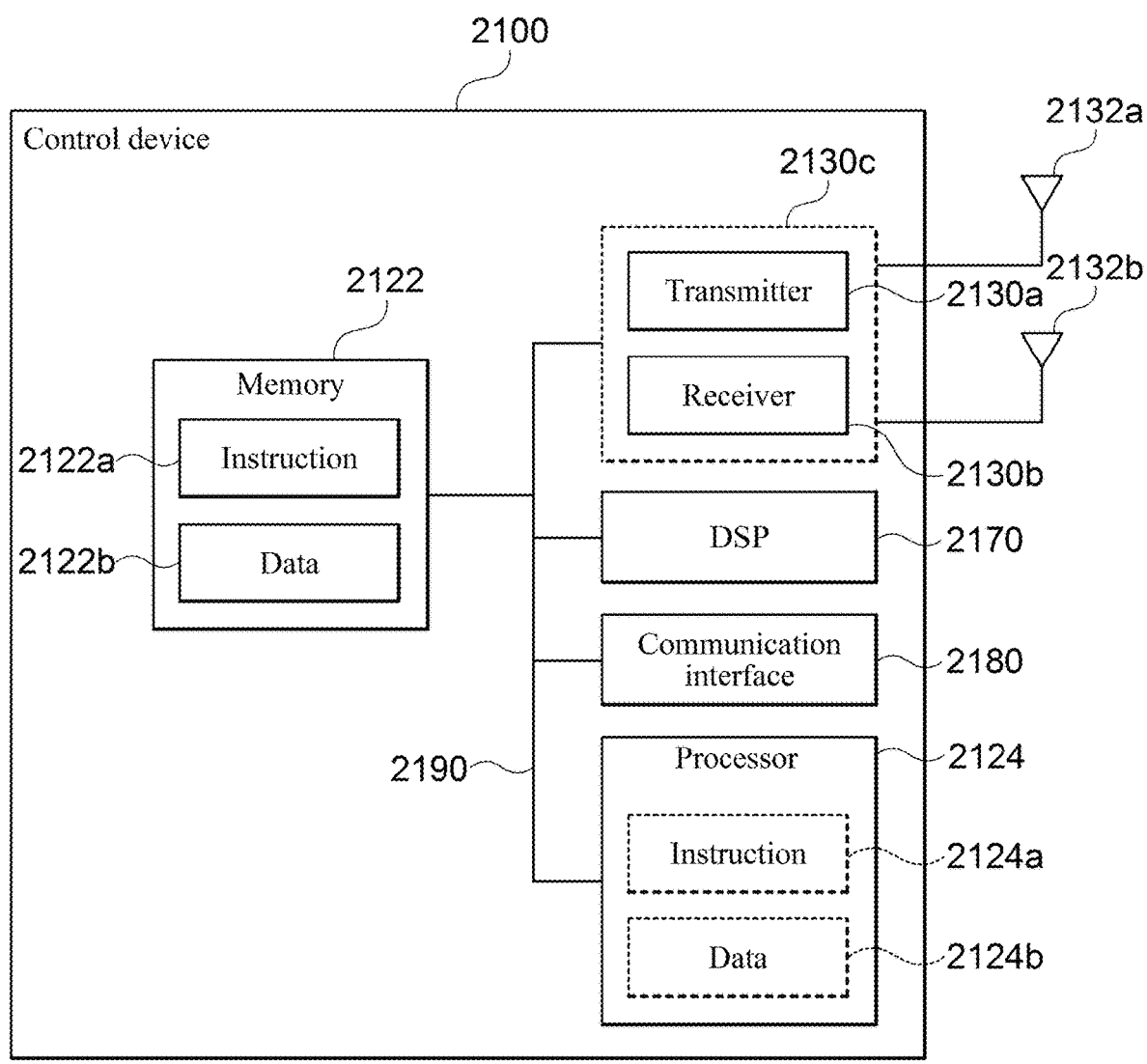
FIG. 24 is a block diagram illustrating a configuration of an autonomous vehicle according to an exemplary embodiment of the present invention.

Hereinafter, a detailed configuration of the control device 2100 for performing the lane marking detecting method according to a present exemplary embodiment will be described in more detail with reference to FIG. 24.

The control device 2100 includes a processor 2124. The processor 2124 may be a general purpose single or multi-chip microprocessor, a dedicated microprocessor, a microcontroller, a programmable gate array, or the like. The processor may also be referred to as a central processing unit (CPU). In addition, in the present exemplary embodiment, the processor 2124 may be used as a combination of a plurality of processors.

The control device 2100 also includes the memory 2122. The memory 2122 may be any electronic component capable of storing electronic information. The memory 2122 may also include a combination of memories 2122 in addition to a single memory.

Data and instructions 2122*a* for performing the lane marking detecting method according to the present invention may be stored in the memory 2122. When the processor 2124 executes the instructions 2122*a*, all or some of the instructions 2122*a* and data 2122*b* required for execution of the instructions 2124*a* and 2124*b* may be loaded onto the processor 2124.

The control device 2100 may include a transmitter 2130*a*, a receiver 2130*b*, or a transceiver 2130*c* for allowing transmission and reception of signals. One or more antennas 2132*a* and 2132*b* may be electrically connected to the transmitter 2130*a*, the receiver 2130*b*, or each transceiver 2130*c*, and may additionally include antennas.

The control device 2100 may include a digital signal processor (DSP) 2170. A digital signal may be quickly processed by the vehicle through the DSP 2170.

The control device 2100 may also include a communication interface 2180. The communication interface 2180 may include one or more ports and/or communication modules for connecting other devices to the control device 2100. The communication interface 2180 may allow a user and the control device 2100 to interact with each other.

Various components of the control device 2100 may be connected together by one or more buses 2190, and the buses 2190 may include a power bus, a control signal bus, a state signal bus, a data bus, and the like. Under the control of the processor 2124, the components may transmit mutual information through the bus 2190 and perform a desired function.

According to the various exemplary embodiments of the present invention described above, both linear lane marking and a curved lane marking may be accurately detected from a drive image captured while a vehicle is running.

Further, according to various embodiments of the present invention, since a linear component is used as a main element, misrecognition due to a vehicle of a next lane and other obstacles may be reduced and both a linear lane marking and a curved lane marking may be accurately detected.

In addition, according to various embodiments of the present invention, since a vehicle accurately recognizes a lane marking of a lane on which a vehicle is running, an AR guidance object (e.g., a route guidance object and a lane departure guidance object) displayed based on a lane marking may be displayed realistically on an AR screen.

In addition, according to various embodiments of the present invention, a lane marking may be accurately recognized and a lane marking-based AR guidance object may be displayed on an AR screen even in an environment in which route line data cannot be provided or route line data is not established according to national characteristics in countries such as China.

In addition, according to the present invention, since a vehicle accurately recognizes a lane marking of a lane on which the vehicle is running, a problem of autonomous driving error due to misrecognition of a lane marking may be solved.

Meanwhile, in the specification and the claims, terms such as "first", "second", "third", "fourth", and the like, if any, will be used to distinguish similar components from each other and be used to describe a specific sequence or a generation sequence, but is not necessarily limited thereto. The terms used as such will be understood by the exemplary embodiments of the invention described herein. Likewise, in the case in which it is described herein that a method includes a series of steps, a sequence of the steps suggested herein is not necessarily a sequence in which the steps may be executed, and any described step may be omitted and/or any other steps that are not described herein may be added to the method. For example, the first component may be referred to as a second component, and similarly, the second component may be referred to as a first component, without departing from the scope of the present invention.

In addition, in the specification and the claims, terms such as "left", "right", "front", "rear", "top", "bottom", "over", "under", and the like do not necessarily indicate relative positions that are not changed, but are used for explanation. It will be understood that these terms are compatible with each other under an appropriate environment so that exemplary embodiments of the present invention set forth herein may be operated in a direction different from a direction illustrated or described herein. The term "connected" as used herein is defined as being connected directly or indirectly in an electrical or non-electrical manner. Here, targets described as being "adjacent to" each other may physically contact each other, be close to each other, or be in the same general range or region, in a context in which the above phrase is used. Here, the presence of phrase "in an exemplary embodiment" means the same exemplary embodiment, but is not necessarily limited thereto.

In addition, in the specification and the claims, terms such as "connected", "connecting", "linked", "linking", "coupled", "coupling", and the like, and various modifications of these terms may be used as the meaning including that one component is directly connected to another component or is indirectly connected to another component through the other component.

On the other hand, when it is mentioned that any component is "directly coupled" or "directly connected" to another component, it is to be understood that any component may be coupled or connected to the other element without another component interposed therebetween.

In addition, terms "module" and "unit" for components used in the present specification are used only in order to easily make the specification. Therefore, these terms do not have meanings or roles that distinguish from each other in themselves.

In addition, the terms used in the present specification are for explaining exemplary embodiments rather than limiting the present invention. The singular expression used in the present specification includes the plural expression unless the context clearly indicates otherwise. In the specification, it is to be noted that the terms "comprising" or "including", and the like, are not be construed as necessarily including several components or several steps described in the specification and some of the above components or steps may not be included or additional components or steps are construed as being further included.

Hereinabove, the present invention has been described with reference to the exemplary embodiments thereof. All exemplary embodiments and conditional illustrations disclosed in the present specification have been described to intend to assist in the understanding of the principle and the concept of the present invention by those skilled in the art to which the present invention pertains. Therefore, it will be understood by those skilled in the art to which the present invention pertains that the present invention may be implemented in modified forms without departing from the spirit and scope of the present invention.

Therefore, the exemplary embodiments disclosed herein should be considered in an illustrative aspect rather than a restrictive aspect. The scope of the present invention is shown in the claims rather than the foregoing description, and all differences within the equivalent range should be interpreted as being included in the present invention.

Meanwhile, the lane marking detecting method according to various exemplary embodiments of the present invention described above may be implemented as programs and be provided to servers or devices. Therefore, the respective apparatuses may access the servers or the devices in which the programs are stored to download the programs.

In addition, the method according to various exemplary embodiments of the present invention described above may be implemented as a program and stored in various non-transitory computer readable media and provided. The non-transitory computer readable medium is not a medium that stores data for a short time such as a register, a cache, a memory, or the like, but means a machine readable medium that semi-permanently stores data. Specifically, various applications or programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like.

Although the exemplary embodiments of the present invention have been illustrated and described hereinabove, the present invention is not limited to the specific exemplary embodiments described above, but may be variously modified by those skilled in the art to which the present invention pertains without departing from the scope and spirit of the present invention as claimed in the claims. These modifications should also be understood to fall within the technical spirit and scope of the present invention.

What is claimed is:

1. A method for detecting a lane marking using a processor, the method comprising:
  acquiring a drive image captured by an image capturing device of a vehicle which is running;
  detecting an edge corresponding to a lane marking from the acquired drive image and generating an edge image based on the detected edge;
  detecting a linear component based on the detected edge and generating a linearly processed edge image based on the detected linear component;
  detecting a lane marking point corresponding to the lane marking using the generated edge image and the linearly processed edge image; and
  detecting the lane marking based on the detected lane marking point,
  wherein the detecting of a lane marking point includes:
    detecting an initial lane marking point using at least one of the generated edge image and the linearly processed edge image; and
    generating a search window, applying the generated search window to each of the generated edge image and the linearly processed edge image, and detecting a subsequent lane marking point satisfying a preset condition from the applied search window.

2. The method of claim 1, further comprising:
  generating a top view image by transforming a view of a front view image corresponding to the acquired drive image, wherein, in the detecting of an edge, an edge corresponding to the lane marking may be detected from the top view image.

3. The method of claim 2, further comprising:
dividing the top view image into a first region and a second region according to a distance from the vehicle,
wherein, in the generating of a linearly processed edge image, the linear component is detected from each of a first edge image corresponding to the divided first region and a second edge image corresponding to the second region, and a linearly processed edge image is generated based on the detected linear component.

4. The method of claim 1, wherein,
in the detecting of a lane marking point, a lane marking point corresponding to a left lane marking and a lane marking point corresponding to a right lane marking are separately detected.

5. The method of claim 1, wherein
the determining of an initial lane marking point includes:
detecting a left initial lane marking point at which a brightness value of a left side is maximized at a lower end of the edge image; and
detecting a right initial lane marking point at which a brightness value of a right side is maximized at the lower end of the edge image.

6. The method of claim 1, wherein
the detecting of a subsequent lane marking point includes:
generating a first search window based on the determined initial lane marking point;
detecting a first subsequent lane marking point satisfying a preset condition by applying the generated first search window to the edge image and the linearly processed edge image;
generating a second search window in which a row in which the first subsequent lane marking point is located in the first search window, is set to a central row; and
disposing the generated second search window above the first search window and detecting a second subsequent lane marking point satisfying the preset condition by applying the second search window to each of the edge image and the linearly processed edge image.

7. The method of claim 1, wherein
a lane marking point satisfying the preset condition is detected only from a middle row of the search window.

8. The method of claim 1, wherein
a row size of the search window is changed adaptively according to an inclination of the linear component.

9. The method of claim 1, further comprising:
calculating an energy value of an active contour model (ACM), wherein the preset condition is a lane marking point at which the energy value of the ACM is minimized.

10. The method of claim 9, wherein
the calculating of an ACM energy value includes:
calculating an internal energy value using an average distance between previous lane marking points and a distance between a current lane marking point and a previous lane marking point; and
calculating an external energy value using brightness values of lane marking points detected from each of the edge image and the linearly processed edge image.

11. The method of claim 1, wherein
the detecting of a lane marking further includes:
calculating a curve equation formed by the detected lane marking points; and
approximating the lane marking points to a curve based on the calculated curve equation.

12. The method of claim 2, wherein
the detecting of a lane marking includes:
detecting lane marking points of the drive image corresponding to lane marking points of the top view image by transforming the lane marking points detected from the top view image into a view of the acquired drive image; and
detecting a lane marking based on the detected lane marking points of the drive image.

13. A lane marking detecting apparatus, the apparatus comprising a processor,
the processor comprising:
an image acquiring unit acquiring a drive image captured by an image capturing device of a vehicle which is running;
an edge detecting unit detecting an edge corresponding to a lane marking from the acquired drive image and generating an edge image based on the detected edge;
a linear component detecting unit detecting a linear component based on the detected edge and generating a linearly processed edge image based on the detected linear component;
a lane marking point detecting unit detecting a lane marking point corresponding to the lane marking using the generated edge image and the linearly processed edge image; and
a lane marking detecting unit detecting the lane marking based on the detected lane marking point,
wherein the lane marking point detecting unit includes:
an initial lane marking point detecting unit detecting an initial lane marking point using at least one of the generated edge image and the linearly processed edge image; and
a subsequent lane marking point detecting unit generating a search window, applying the generated search window to each of the generated edge image and the linearly processed edge image, and detecting a subsequent lane marking point satisfying a preset condition from the applied search window.

14. The lane marking detecting apparatus of claim 13, the processor further comprising:
an image view transforming unit generating a top view image by transforming a view of a front view image corresponding to the acquired drive image,
wherein the edge detecting unit detects an edge corresponding to the lane marking from the top view image.

15. The lane marking detecting apparatus of claim 14, the processor further comprising:
an image region dividing unit dividing the top view image into a first region and a second region according to a distance from the vehicle,
wherein the linear component is detected from each of a first edge image corresponding to the divided first region and a second edge image corresponding to the second region, and a linearly processed edge image is generated based on the detected linear component.

16. The lane marking detecting apparatus of claim 13, the processor further comprising:
an active contour model energy (ACM) calculating unit calculating an energy value of an ACM,
wherein the preset condition is a lane marking point at which the energy value of the ACM is minimized.

17. The lane marking detecting apparatus of claim 13, the processor further comprising:
a lane marking point approximating unit calculating a curve equation formed by the detected lane marking points and approximating the lane marking points to a curve based on the calculated curve equation.

18. A non-transitory computer readable storage medium containing instructions, that when executed by one or more processors, cause the one or more processor to perform a lane marking detecting method, the method comprising:
- acquiring a drive image captured by an image capturing device of a vehicle which is running;
- detecting an edge corresponding to a lane marking from the acquired drive image and generating an edge image based on the detected edge;
- detecting a linear component based on the detected edge and generating a linearly processed edge image based on the detected linear component;
- detecting a lane marking point corresponding to the lane marking using the generated edge image and the linearly processed edge image; and
- detecting the lane marking based on the detected lane marking point,
- wherein the detecting of a lane marking point includes:
  - detecting an initial lane marking point using at least one of the generated edge image and the linearly processed edge image; and
  - generating a search window, applying the generated search window to each of the generated edge image and the linearly processed edge image, and detecting a subsequent lane marking point satisfying a preset condition from the applied search window.

* * * * *